(12) United States Patent
Mukaida et al.

(10) Patent No.: US 7,024,514 B2
(45) Date of Patent: Apr. 4, 2006

(54) MEMORY CONTROLLER, FLASH MEMORY SYSTEM EMPLOYING MEMORY CONTROLLER AND METHOD FOR CONTROLLING FLASH MEMORY DEVICE

(75) Inventors: Naoki Mukaida, Tokyo (JP); Kenzou Kita, Tokyo (JP)

(73) Assignee: TDK Corporation, Tokyo (JP)

( * ) Notice: Subject to any disclaimer, the term of this patent is extended or adjusted under 35 U.S.C. 154(b) by 619 days.

(21) Appl. No.: 10/177,368

(22) Filed: Jun. 19, 2002

(65) Prior Publication Data
US 2002/0194451 A1    Dec. 19, 2002

(30) Foreign Application Priority Data
Jun. 19, 2001    (JP)    ............................. 2001-184686

(51) Int. Cl.
G06F 12/02    (2006.01)
(52) U.S. Cl. ...................... 711/103; 711/170; 711/173
(58) Field of Classification Search ..................... None
See application file for complete search history.

(56) References Cited

U.S. PATENT DOCUMENTS

| | | | | |
|---|---|---|---|---|
| 5,809,539 | A * | 9/1998 | Sakakibara et al. ......... | 711/151 |
| 5,930,193 | A * | 7/1999 | Achiwa et al. ......... | 365/230.03 |
| 6,125,435 | A | 9/2000 | Estakhri et al. ............. | 711/201 |
| 6,172,906 | B1 * | 1/2001 | Estakhri et al. ......... | 365/185.11 |
| 6,721,843 | B1 * | 4/2004 | Estakhri ..................... | 711/103 |
| 6,781,879 | B1 * | 8/2004 | Tanzawa et al. ........ | 365/185.11 |

FOREIGN PATENT DOCUMENTS

JP    06-124231    5/1994

* cited by examiner

*Primary Examiner*—T Nguyen
(74) *Attorney, Agent, or Firm*—Seed IP Law Group PLLC

(57) ABSTRACT

A memory controller which can perform a series of data write operation to a flash memory device fast is disclosed. The memory controller according to the present invention is the memory controller for accessing a memory having a plurality of physical blocks based on a host address provided from a host computer. The memory controller has means for dividing the physical blocks into a plurality of groups, means for forming a plurality of virtual blocks by virtually combining a plurality of physical blocks each of which belongs to different groups, the virtual blocks can be divided into at least a first class and a second class, and means for assigning adjacent host addresses into different physical blocks belonging to the same virtual block of the first class and assigning adjacent host addresses into the same physical blocks belonging to the same virtual block of the second class.

15 Claims, 16 Drawing Sheets

FIG.6

| FLASH MEMORY CHIP 2-0 | FLASH MEMORY CHIP 2-1 | FLASH MEMORY CHIP 2-2 | FLASH MEMORY CHIP 2-3 |
|---|---|---|---|
| BLOCK #0 | BLOCK #0 | BLOCK #0 | BLOCK #0 |
| BLOCK #1 | BLOCK #1 | BLOCK #1 | BLOCK #1 |
| BLOCK #2 | BLOCK #2 | BLOCK #2 | BLOCK #2 |
| ⋮ | ⋮ | ⋮ | ⋮ |
| BLOCK #150 | | | |
| ⋮ | ⋮ | ⋮ | ⋮ |
| | | | BLOCK#3048 |
| ⋮ | ⋮ | ⋮ | ⋮ |
| | BLOCK#6811 | | |
| ⋮ | ⋮ | ⋮ | ⋮ |
| BLOCK#8191 | BLOCK#8191 | BLOCK#8191 | BLOCK#8191 |

FIG. 7

| BLOCK #150 | BLOCK #6811 | BLOCK #8191 | BLOCK #3048 |
|---|---|---|---|
| VIRTUAL PAGE #0 | VIRTUAL PAGE #1 | VIRTUAL PAGE #2 | VIRTUAL PAGE #3 |
| VIRTUAL PAGE #4 | VIRTUAL PAGE #5 | VIRTUAL PAGE #6 | VIRTUAL PAGE #7 |
| VIRTUAL PAGE #8 | VIRTUAL PAGE #9 | VIRTUAL PAGE #10 | VIRTUAL PAGE #11 |
| . . . . . . . . | . . . . . . . . | . . . . . . . . | . . . . . . . . |
| VIRTUAL PAGE #124 | VIRTUAL PAGE #125 | VIRTUAL PAGE #126 | VIRTUAL PAGE #127 |

FIG. 8

| | SLOT#0 | | SLOT#1 | | SLOT#2 | | SLOT#3 | |
|---|---|---|---|---|---|---|---|---|
| VIRTUAL BLOCK INDICATING AREA #0 | FLAG #0-0 | CELL #0-0 | FLAG #0-1 | CELL #0-1 | FLAG #0-2 | CELL #0-2 | FLAG #0-3 | CELL #0-3 |
| VIRTUAL BLOCK INDICATING AREA #1 | FLAG #1-0 | CELL #1-0 | FLAG #1-1 | CELL #1-1 | FLAG #1-2 | CELL #1-2 | FLAG #1-3 | CELL #1-3 |
| VIRTUAL BLOCK INDICATING AREA #2 | FLAG #2-0 | CELL #2-0 | FLAG #2-1 | CELL #2-1 | FLAG #2-2 | CELL #2-2 | FLAG #2-3 | CELL #2-3 |
| ... | . | . | . | . | . | . | . | . |
| VIRTUAL BLOCK INDICATING AREA #7999 | FLAG #7999-0 | CELL #7999-0 | FLAG #7999-1 | CELL #7999-1 | FLAG #7999-2 | CELL #7999-2 | FLAG #7999-3 | CELL #7999-3 |

31

FOR LATERAL WRITING VIRTUAL BLOCKS / FOR VERTICAL WRITING VIRTUAL BLOCKS

FIG.9

| | SLOT #0 | SLOT #1 | SLOT #2 | SLOT #3 |
|---|---|---|---|---|
| QUEUE SET #0 | QUEUE #0-0 | QUEUE #0-1 | QUEUE# 0-2 | QUEUE #0-3 |
| QUEUE SET #1 | QUEUE #1-0 | QUEUE #1-1 | QUEUE# 1-2 | QUEUE #1-3 |
| QUEUE SET #2 | QUEUE #2-0 | QUEUE #2-1 | QUEUE# 2-2 | QUEUE #2-3 |
| QUEUE SET #3 | QUEUE #3-0 | QUEUE #3-1 | QUEUE# 3-2 | QUEUE #3-3 |
| QUEUE SET #4 | QUEUE #4-0 | QUEUE #4-1 | QUEUE# 4-2 | QUEUE #4-3 |
| QUEUE SET #5 | QUEUE #5-0 | QUEUE #5-1 | QUEUE# 5-2 | QUEUE #5-3 |

32

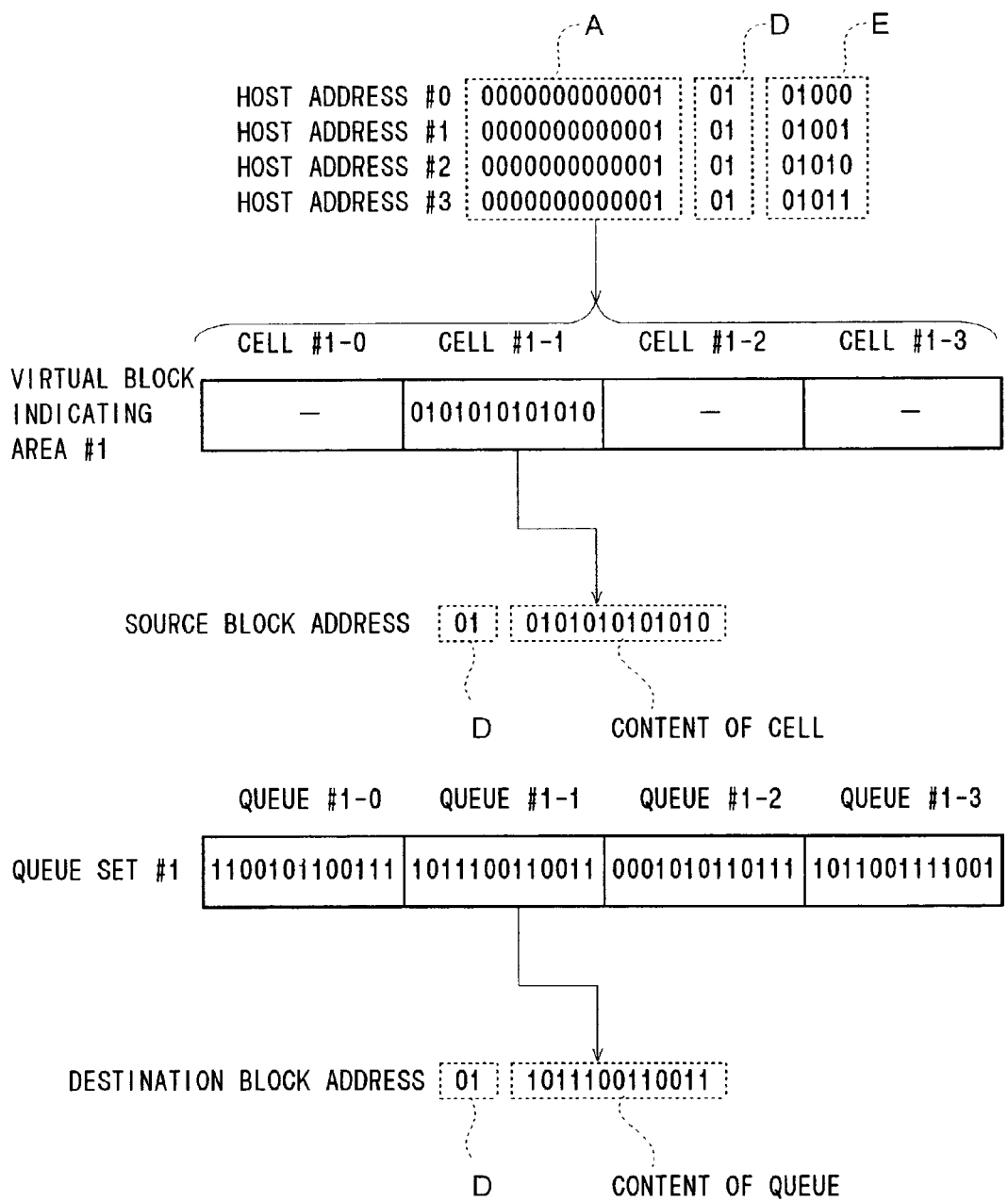

MEMORY CONTROLLER, FLASH MEMORY SYSTEM EMPLOYING MEMORY CONTROLLER AND METHOD FOR CONTROLLING FLASH MEMORY DEVICE

BACKGROUND OF THE INVENTION

The present invention relates to a memory controller, a flash memory system and a method controlling a flash memory device, and particularly, to such a memory controller and a flash memory system that can perform a series of data write operations to a flash memory device fast and a method for perform a series of data write operations to a flash memory device fast.

DESCRIPTION OF THE PRIOR ART

In recent years, flash memory devices, particularly NAND type flash memory devices, are widely used as semiconductor memory devices for memory cards, silicon disks and the like. In such a NAND type flash memory device, although a transition from an erased state (logical value="1") to a programmed state (logical value="0") can be performed for each memory cell as an individual unit, a transition from the programmed state (0) to the erased state (1) cannot be performed for each memory cell as an individual unit. Such a transition from the programmed state (0) to the erased state (1) can be only performed for a predetermined number of memory cells as a unit, called a "block", constituted of a plurality of memory cells. Such an operation is called "block erasing".

According to the NAND type flash memory device, because the transition from the programmed state (0) to the erased state (1) cannot be performed for each memory cell as an individual unit, in order to write data into a certain block, it is required to perform a block erasing operation to change the states of all memory cells included in the block to the erased state (1). A block-erased block becomes a free block in which no data are stored. In order to write new data into a flash memory device, search is made for such a free block and the new data are written into a found free block. Each block is constituted of a plurality of "pages" each of which is an access unit for a data reading and a data writing.

The data writing for the flash memory device is performed as follows:

First, when a data writing request is issued from a host computer and the address and the data to be written are transferred, the data is temporarily stored into a buffer memory employed in a controller. Then, the controller transfers the data temporarily stored in the buffer memory to the flash memory device and requests the flash memory device to store it into the page designated by the address. Responsive to it, the flash memory device stores the data transferred from the controller into the designated page. The data write operation is then completed.

The host computer treats the pages in the same block as assigned the successive addresses by ordinary. Most of the data writing request from the host computer are directed to a plurality of successive addresses. In this case, it is necessary for the controller to write data successively to the plurality of successive pages in certain block.

Specifically, the controller transfers the data to be stored in the first page to the flash memory device and requests the flash memory device to store the data into this page. When the flash memory device stores the transferred data into the designated page in response to the operation, the controller transfers the data to be stored in the next page to the flash memory device and requests the flash memory device to store the data into this page. When such operations are successively performed for the plurality of requested addresses, a series of data write operations for the plurality of successive addresses is completed.

The data write operation for one page requires a predetermined operation time which is constituted of the time for transmitting the data to be stored from the controller to the flash memory device (data transmission period), the time for issuing a data write command from the controller to the flash memory device (command issuing period), the time for actually storing the data into the flash memory device (flash programming period), and so forth; the flash programming period is particularly long time (about 200 μsec for example).

According to the prior art, when the data write request for the plurality of successive addresses is issued from the host computer, a time substantially in proportion to the number of pages into which the data are to be stored is required to complete a series of data write operations because the unit of data write operation which requires relatively long time should be successively performed.

Thus, it has been desired that a memory controller, a flash memory system and a method for controlling a flash memory device can perform a series of data write operations fast when the data write request for the plurality of successive addresses is issued from the host computer.

SUMMARY OF THE INVENTION

It is therefore an object of the present invention to provide a memory controller can perform a series of data write operations for the flash memory device fast and a flash memory system employing such a memory controller.

Another object of the present invention is to provide a method for controlling a flash memory device can perform a series of data write operations for the flash memory device fast.

The above and other objects of the present invention can be accomplished by a memory controller for accessing a memory having a plurality of physical blocks based on a host address provided from a host computer, comprising:
  means for dividing the physical blocks into a plurality of groups;
  means for forming a plurality of virtual blocks by virtually combining a plurality of physical blocks each of which belongs to different groups, the virtual blocks can be divided into at least a first class and a second class; and
  means for assigning adjacent host addresses to different physical blocks belonging to the same virtual block of the first class and assigning adjacent host addresses to the same physical blocks belonging to the same virtual block of the second class.

According to the present invention, in the virtual blocks of the first class, because the adjacent host addresses are assigned to different physical blocks belonging to the same virtual block, when the access request using a plurality of successive host addresses is issued from the host computer, different physical blocks are accessed by the addresses. Thus, the physical blocks to be accessed can independently operate so that a series of operations can be executed in parallel. Therefore, a series of operations for the flash memory can be performed in fast. On the other hand, in the virtual blocks of the second class, because the adjacent host addresses are assigned to the same physical block belonging to the same virtual block, even if the data overwrite requests are frequently issued from the host computer, the number of inter-block data transferring can be reduced so that each data overwrite operation can be finished in fast.

In a preferred aspect of the present invention, one of the virtual blocks of the second class corresponds to an area including a part in which a top of the host address is assigned.

According to this preferred aspect of the present invention, the data overwrite operation can be performed in fast for the area, in which a FAT (file allocation table) and so forth are stored, including a part in which a top of the host address is assigned.

In a further preferred aspect of the present invention, the memory controller further comprises means for determining a number of virtual blocks of the second class.

According to this preferred aspect of the present invention, the number of virtual blocks of the second class can be varied.

In a further preferred aspect of the present invention, the groups are classified at least according to memory chips.

According to this preferred aspect of the present invention, because the physical blocks are classified according to the memory chips, in the virtual block of the first class the physical blocks corresponding to the plurality of successive host addresses belong to different memory chips one another. Therefore, if the memory chips are not a type can perform a parallel operation but an ordinary type, the parallel operation can be achieved by operating the physical blocks independently.

In a further preferred aspect of the present invention, the groups are classified at least according to banks.

According to this preferred aspect of the present invention, because the physical blocks are classified according to the banks, in the virtual block of the first class the physical blocks corresponding to the plurality of successive host addresses belong to different banks one another. Therefore, if the number of the memory chip is only one, the parallel operation can be achieved by operating the banks independently. Particularly, in case of virtually combining a plurality of physical blocks belonging to different banks using a plurality of memory chips to form the virtual blocks, a series of operations for the flash memory can be performed in faster because much more operations can be executed in parallel.

The above and other objects of the present invention can be also accomplished by a memory controller for accessing a memory having a plurality of physical blocks, each of which is constituted of n physical pages, based on a host address provided from a host computer, comprising:

means for forming a plurality of virtual blocks constituted of n×m virtual pages by virtually combining m physical blocks; and means for assigning adjacent host addresses to different physical blocks belonging to the same virtual block of the first class and assigning adjacent host addresses to the same physical blocks belonging to the same virtual block of the second class.

In a preferred aspect of the present invention, the adjacent virtual pages in the same virtual block belong to different physical blocks.

In a further preferred aspect of the present invention, one of the virtual blocks of the second class corresponds to an area including a part in which a top of the host address is assigned.

The above and other objects of the present invention can be also accomplished by a flash memory system comprising a flash memory having a plurality of physical blocks and a memory controller accessing the flash memory based on a host address provided from a host computer, the memory controller, comprising:

means for dividing the physical blocks into a plurality of groups;

means for forming a plurality of virtual blocks by virtually combining a plurality of physical blocks each of which belongs to different groups, the virtual blocks can be divided into at least a first class and a second class; and means for assigning adjacent host addresses to different physical blocks belonging to the same virtual block of the first class and assigning adjacent host addresses to the same physical blocks belonging to the same virtual block of the second class.

The above and other objects of the present invention can be also accomplished by a method for controlling a flash memory device, comprising:

converting adjacent host addresses into internal addresses corresponding to different physical blocks in response to an access request based on a host address belonging to a first class; and converting adjacent host addresses into internal addresses corresponding to the same physical block in response to an access request based on a host address belonging to a second class.

The above and other objects and features of the present invention will become apparent from the following description made with reference to the accompanying drawings.

BRIEF DESCRIPTION OF THE DRAWINGS

FIG. 6 is a schematic diagram showing the mapping example of the virtual block.

FIG. 7 is a schematic diagram showing the structure of the virtual pages constituting the virtual block shown in FIG. 6.

FIG. 8 is a schematic diagram showing the data structure of an address translation table 31.

FIG. 9 is a schematic diagram showing the data structure of a write queue 32.

FIG. 17 is a schematic diagram showing the generation method to obtain a source block address and a destination block address using the address translation table 31 and the write queue 32 during the data write operation #4.

DESCRIPTION OF THE PREFERRED EMBODIMENT

A preferred embodiment of the present invention will be specifically explained with reference to the drawings.

Figure 1:
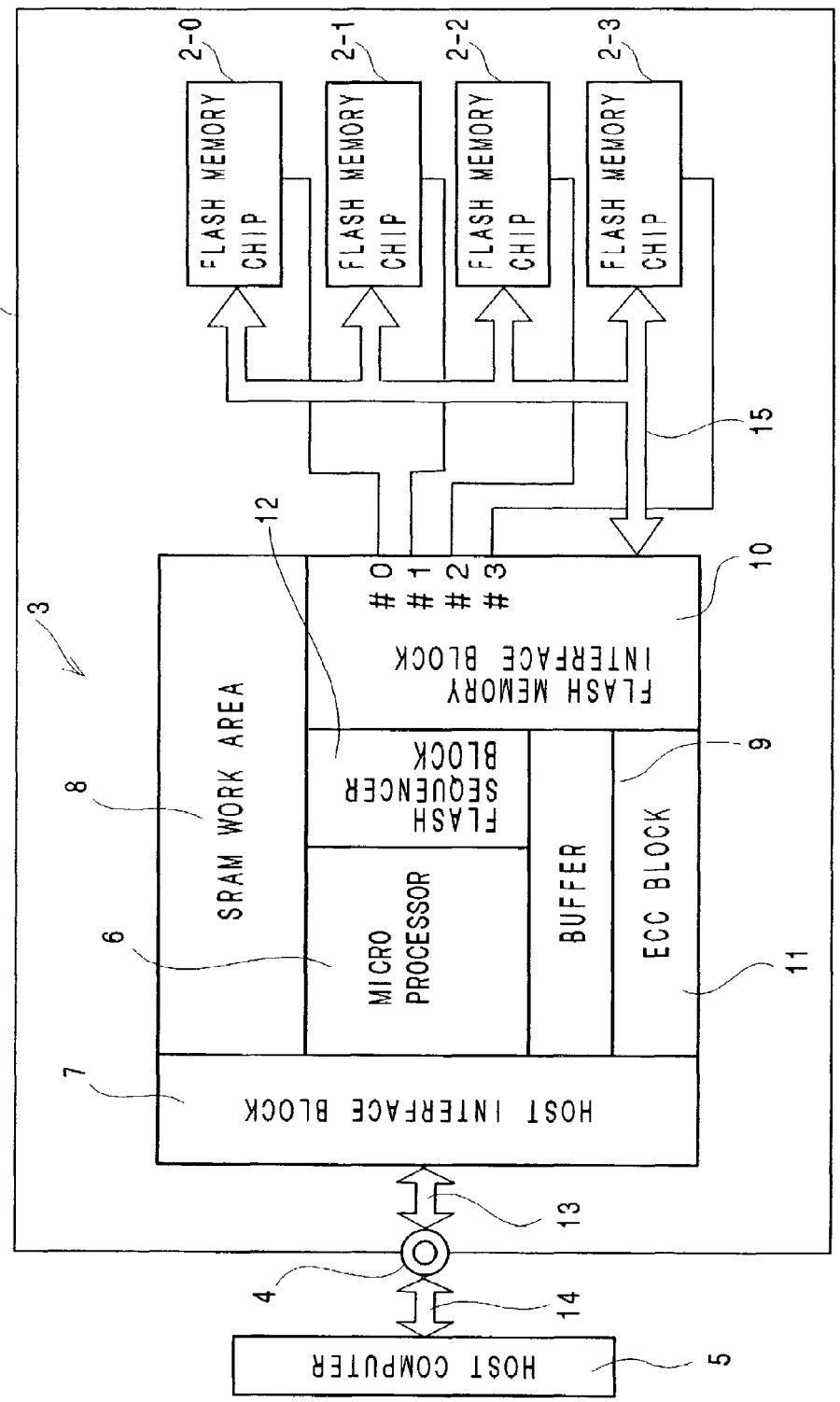
FIG. 1 is a schematic block diagram showing a flash memory system 1 that is a preferred embodiment of the present invention.

FIG. 1 is a schematic block diagram showing a flash memory system 1 that is the preferred embodiment of the present invention.

As shown in FIG. 1, the flash memory system 1 has the shape of a card, and is composed of four flash memory chips 2-0 to 2-3, a controller 3, and a connector 4, each of which is integrated into the card. The flash memory system 1 can be removably attached to a host computer 5 for use as a kind of an external storage device for the host computer 5. The host computer 5 can be various information processing equipment such as a personal computer for processing various information such as text data, sound data, and visual data and a digital still camera.

Each flash memory chip 2-0 to 2-3 is a semiconductor chip having a capacity of 128M bytes (1G bits) for example. In the flash memory system 1, each page, which is a minimum access unit, is composed of 512 bytes for user data. Thus, an address space of each flash memory chip 2-0 to 2-3 includes 256K pages, and the amount of address space of the flash memory chips 2-0 to 2-3 is 1M pages. In the flash memory system 1, these four flash memory chips 2-0 to 2-3 are treated as a big single memory having a capacity of 512M bytes (4G bits) and 1M pages of address space. Address information of 20-bit length is required to access such a memory having 1M pages of address space. Thus, to access an individual page, the host computer 5 provides address information of 20-bit length to the flash memory system 1. Such address information of 20-bit length provided from the host computer 5 to the flash memory system 1 is referred as a "host address".

The controller 3 is composed of a microprocessor 6, a host interface block 7, a SRAM work area 8, a buffer 9, a flash memory interface block 10, an ECC (error correction code) block 11, and a flash sequencer block 12. These functional blocks composing the controller 3 are integrated in a single semiconductor chip.

The microprocessor 6 is a functional block which controls the operations of each functional block composing the controller 3.

The host interface block 7 is connected to the connector 4 via a bus 13 to send or receive data, address information, status information, and external command information to/from the host computer 5 under the control of the microprocessor 6. Specifically, when the flash memory system 1 is attached to the host computer 5, the flash memory system 1 and the host computer 5 are electrically connected to each other via the bus 13, the connector 4, and the bus 14. When the electrical connection between the flash memory system 1 and the host computer 5 is established, various information such as data provided from the host computer 5 to the flash memory system 1 is input to the controller 3 via the host interface block 7 as an input part, and various information such as data provided from the flash memory system 1 to the host computer 5 is output from the controller 3 via the host interface block 7 as an output part. Further, the host interface block 7 employs task file registers (not shown) temporarily storing the host address and the external commands from the host computer 5 and error registers (not shown) which is set in response to error occurrence.

The SRAM work area 8, composed of a plurality of SRAM cells, is a working area for temporarily storing data is used by the microprocessor 6 for controlling the flash memory chips 2-0 to 2-3.

The buffer 9 is for temporarily storing data read from the flash memory chips 2-0 to 2-3 and data to be written into the flash memory chips 2-0 to 2-3. Specifically, data read from the flash memory chips 2-0 to 2-3 are temporarily stored in the buffer 9 until the host computer 5 becomes ready to receive them, and data to be written into the flash memory chips 2-0 to 2-3 are temporarily stored into the buffer 9 until the flash memory chips 2-0 to 2-3 become ready to be written.

The flash memory interface block 10 is a functional block for sending or receiving data, address information, status information, and internal command information to/from the flash memory chips 2-0 to 2-3 via a bus 15 and for supplying the chip selection signals #0 to #3 to the flash memory chips 2-0 to 2-3. One of the chip selection signals #0 to #3 is activated based on the upper two bits of the host address provided from the host computer 5 when a data read operation or a data write operation is requested by the host computer 5. Specifically, the chip selection signals #0 is selectively activated based on the upper two bits of the host address being "00", the chip selection signals #1 is selectively activated based on the upper two bits of the host address being "01", the chip selection signals #2 is selectively activated based on the upper two bits of the host address being "10", and the chip selection signals #3 is selectively activated based on the upper two bits of the host address being "11". Each of the chip selection signals #0 to #3 activates a corresponding flash memory chip 2-0 to 2-3 to allow the data read operation and the data write operation to be performed. It is noted that the "internal command information" is distinguished from the "external command information": the internal command information is issued from the controller 3 to control the flash memory chips 2-0 to 2-3; the external command information is issued from the host computer 5 to control the flash memory system 1.

The ECC block 11 is a functional block for generating an error correction code to be added to data to be written to the flash memory chips 2-0 to 2-3 and to correct any error included in data read from the flash memory chips 2-0 to 2-3.

The flash sequencer block 12 is a functional block for controlling a data transport between the flash memory chips 2-0 to 2-3 and the buffer 9. The flash sequencer block 12 has a plurality of registers (not shown). When a certain value necessary for reading data from the flash memory chips 2-0 to 2-3 or to write data into the flash memory chips 2-0 to 2-3 is set in the registers (not shown) under the control of the microprocessor 6, the flash sequencer block 12 performs certain operations necessary to read data or to write data.

Next, the physical structure of each of the flash memory cells included in the flash memory chips 2-0 to 2-3 will be explained.

Figure 2:
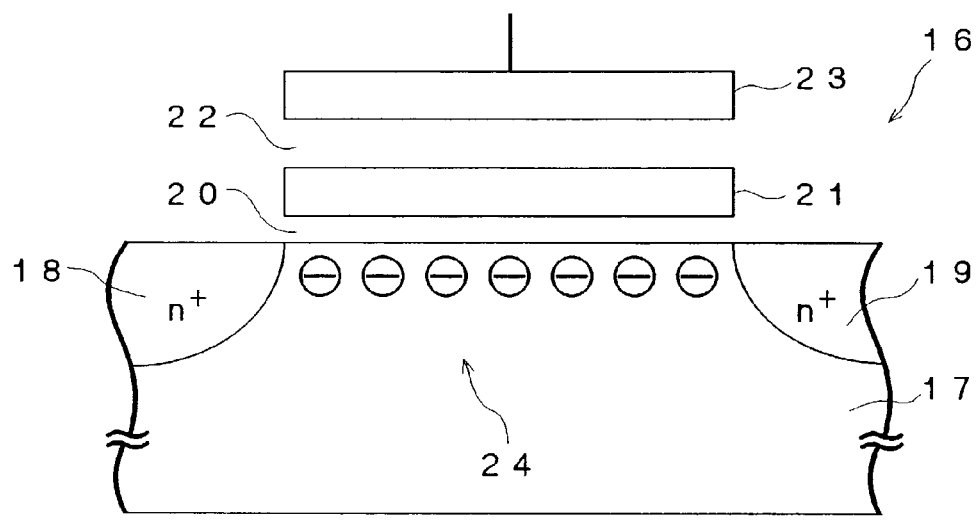
FIG. 2 is a schematic sectional diagram showing a cross-section of the flash memory cell 16 in the erased state.

FIG. 2 is a schematic sectional diagram showing a cross-section of a flash memory cell 16 included in the flash memory chips 2-0 to 2-3.

As shown in FIG. 2, the flash memory cell 16 is composed of a semiconductor substrate 17 of p-type, the source and drain diffusion regions 18 and 19 of n-type each of which is formed in the semiconductor substrate 17, the tunnel oxide film 20 formed on a part of the semiconductor substrate 17 located between the source and drain diffusion regions 18 and 19, a floating gate electrode 21 formed on the tunnel oxide film 20, an insulating film 22 formed on the floating gate electrode 21, and a control gate electrode 23 formed on the insulating film 22. In the flash memory chips 2-0 to 2-3, pluralities of the flash memory cells 16 having the above-mentioned structure are serially connected to form a flash memory of NAND type.

The flash memory cell 16 exhibits either an "erased state" or a "programmed state" depending on whether electrons are injected into the floating gate electrode 21. The flash memory cell 16 being in the erased state indicates that the data stored therein is "1", and the flash memory cell 16 being in the programmed state indicates that the data stored therein is "0". That is, each flash memory cell 16 can store one bit of digital data.

As shown in FIG. 2, in the erased state, substantially no electrons are injected into the floating gate electrode 21. In the erased state, the flash memory cell 16 becomes the transistor of a depletion type so that a channel 24 appears at the surface of the semiconductor substrate 17 of p-type located between the source and drain diffusion regions 18 and 19 regardless of whether reading voltage is being applied to the control gate electrode 23. Therefore, the source and drain diffusion regions 18 and 19 are electrically connected to each other by the channel 24 regardless of whether reading voltage is being applied to the control gate electrode 23.

Figure 3:
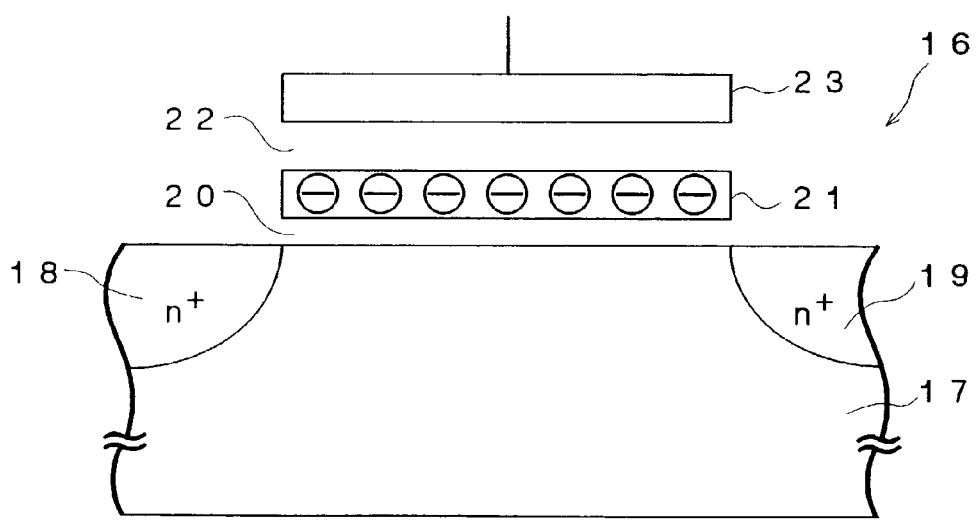
FIG. 3 is a schematic sectional diagram showing a cross-section of the flash memory cell 16 in the programmed state.

FIG. 3 is a schematic sectional diagram showing a cross-section of the flash memory cell 16 in the programmed state.

As shown in FIG. 3, in the programmed state, electrons are injected into the floating gate electrode 21. The electrons injected into the floating gate electrode 21 stay therein for an extremely long period because the floating gate electrode 21 is sandwiched between the tunnel oxide film 20 and the insulating film 22. In the programmed state, the flash memory cell 16 becomes the transistor of an enhancement type. Thus, when reading voltage is not applied to the control gate electrode 23, no channel is induced at the surface of the semiconductor substrate 17 of p-type located between the source and drain diffusion regions 18 and 19. On the other hand, when reading voltage is applied to the control gate electrode 23, the channel (not shown) is induced at the surface of the semiconductor substrate 17 of n-type located between the source and drain diffusion regions 18 and 19. Therefore, when reading voltage is not applied to the control gate electrode 23, the source and drain diffusion regions 18 and 19 are electrically isolated from each; when reading voltage is applied to the control gate electrode 23, the source and drain diffusion regions 18 and 19 are electrically connected to each other.

It can be detected whether the flash memory cell 16 is in the erased state or the programmed state by the following steps. First, reading voltage is applied to every control gate electrode 23 of the flash memory cells 16 except for the selected flash memory cell 16, so that the flash memory cells 16 are serially connected to form a serial circuit. Next, it is detected whether or not current can flow through the serial circuit. Then, the state of the selected flash memory cell 16 is judged to be in the erased state if current can flow through the serial circuit, and the state of the selected flash memory cell 16 is judged in the programmed state if current cannot flow through the serial circuit. In this manner, the data stored in each flash memory cell 16 can be detected whether "0" or "1." In the flash memory of NAND type, however, two or more data stored in flash memory cells 16 which belong to the same serial circuit cannot be read out simultaneously.

To change the state of the flash memory cell 16 from the erased state to the programmed state, high positive voltage is applied to the control gate electrode 23 to inject electrons into the floating gate electrode 21 via the tunnel oxide film 20. The injection of the electrons into the floating gate electrode 21 can be performed using an F-N tunnel current. On the other hand, to change the state of the flash memory cell 16 from the programmed state to the erased state, high negative voltage is applied to the control gate electrode 23 to eject the previously injected electrons from the floating gate electrode 21 via the tunnel oxide film 20.

Next, the specific structure of the address space of each of the flash memory chips 2-0 to 2-3 will be explained.

Figure 4:
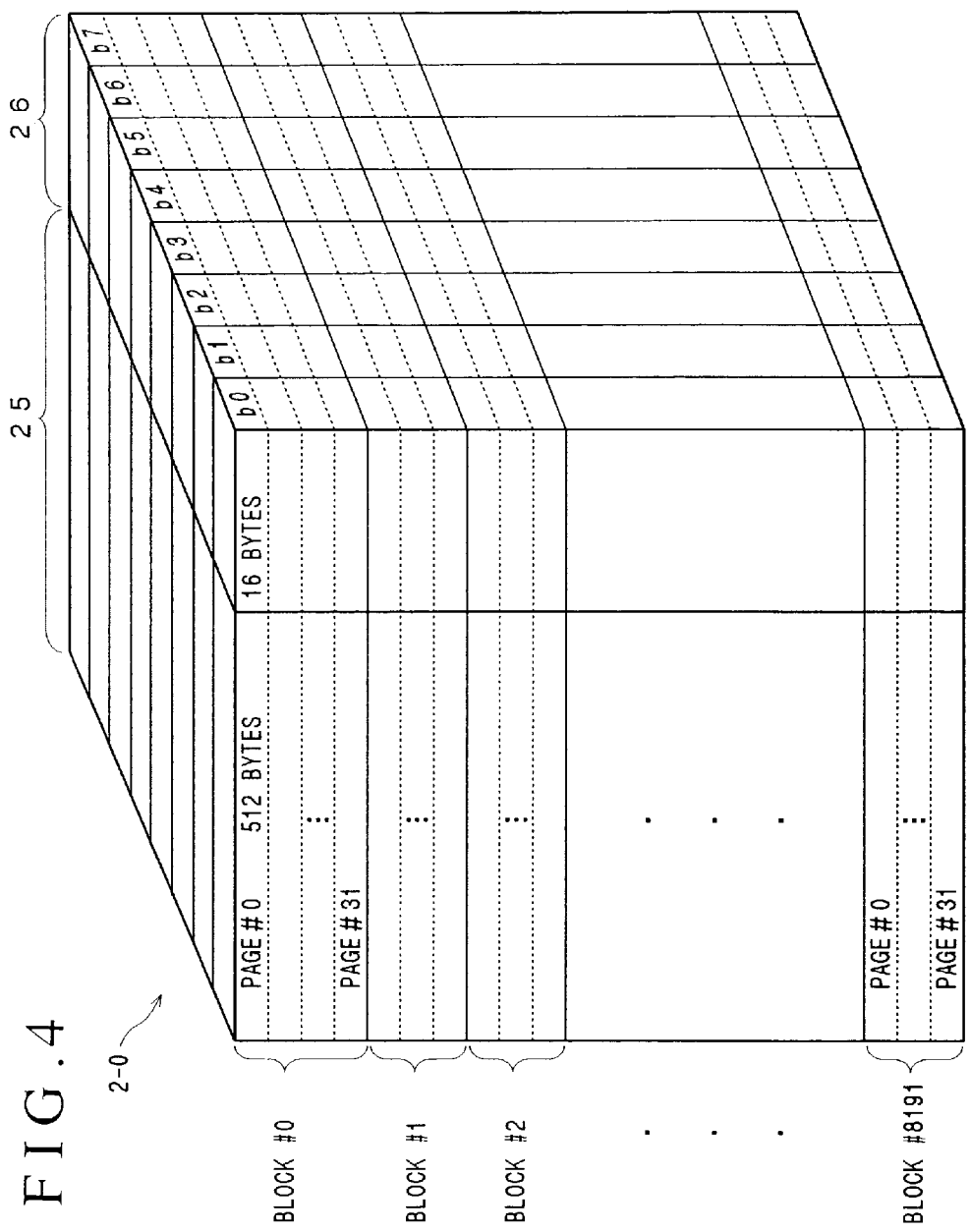
FIG. 4 is a schematic diagram showing the structure of the address space of the flash memory chip 2-0.

FIG. 4 is a schematic diagram showing the structure of the address space of the flash memory chip 2-0.

As shown in FIG. 4, the address space of the flash memory chip 2-0 is divided into 8192 physical blocks composed of physical blocks #0 to #8191. Although not shown in FIG. 4, each of the address spaces of the flash memory chips 2-1 to 2-3 is also divided into 8192 physical blocks composed of blocks #0 to #8191. Each physical block has a memory capacity of 16K bytes.

Each physical block is a unit of block erasing. In other words, according to the flash memory chips 2-0 to 2-3, the state of each flash memory cell 16 cannot be changed from the programmed state to the erased state in cell units. To change the state of the flash memory cell 16 from the programmed state to the erased state, it is required to change the states of all flash memory cells 16 of the physical block including the flash memory cells 16 to be erased. In contrast, the state of each flash memory cell 16 can be changed from the erased state to the programmed state in cell units.

Further, as shown in FIG. 4, each physical block #0 to #8191 composing the flash memory chip 2-0 is divided into 32 physical pages composed of physical pages #0 to #31. Similar to the physical blocks #0 to #8191 composing the flash memory chip 2-0, each physical block #0 to #8191 composing the flash memory chips 2-1 to 2-3 is also divided into 32 physical pages.

Each of the physical pages is an access unit during the data read operation and the data write operation and is composed of the user area 25 of 512 bytes and the redundant area 26 of 16 bytes where 1 byte is equal to 8 bits composed of bits b0 to b7. The user area 25 is an area for storing user data supplied from the host computer 5.

Figure 5:
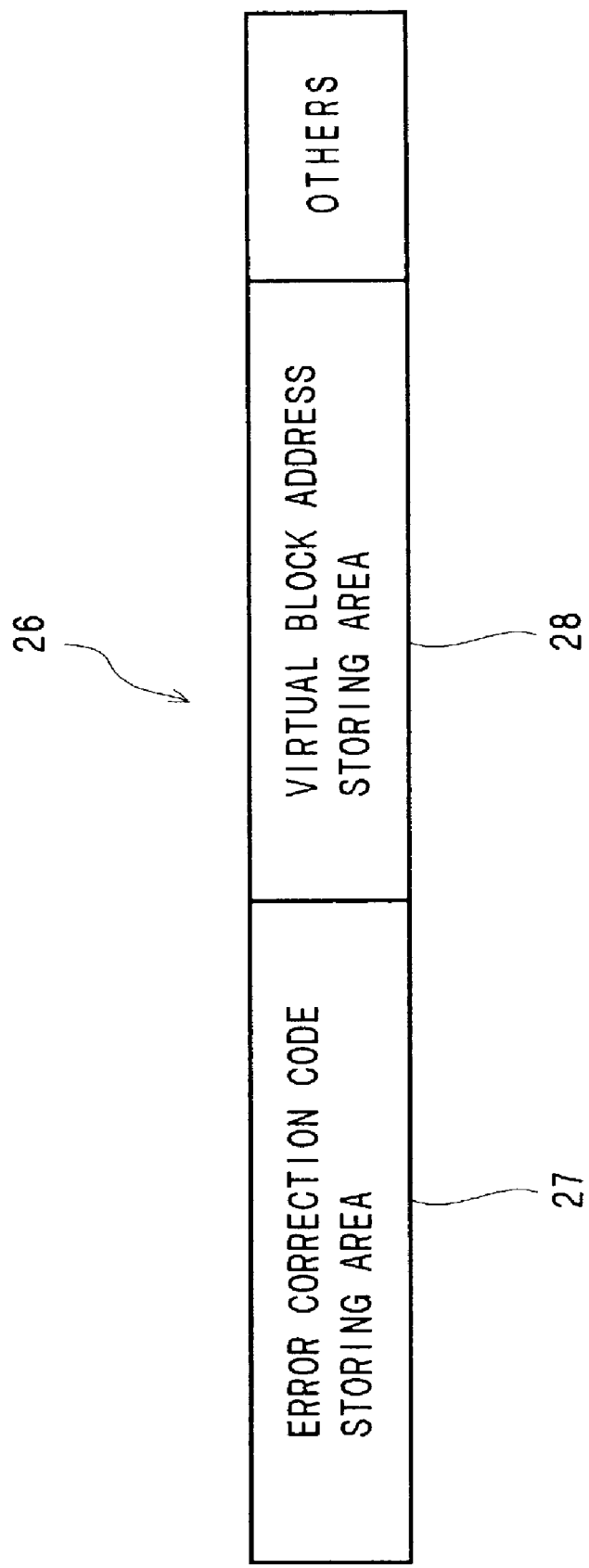
FIG. 5 is a schematic diagram showing the data structure of a redundant area 26.

FIG. 5 is a schematic diagram showing the data structure of the redundant area 26.

As shown in FIG. 5, the redundant area 26 is composed of an error correction code storing area 27, a virtual block address storing area 28, and the area for storing other additional information.

The error correction code storing area 27 is an area for storing an error correction code for correcting errors included in the user data stored in the corresponding user area 25. The user data including less than predetermined number of errors can be completely corrected by using the error correction code stored in the error correction code storing area 27.

The virtual block address storing area 28 is an area for storing an address of the virtual block (virtual block address) including this physical block. Details of the virtual block and the virtual block address are explained later.

The other area of the redundant area 26 is an area for storing a block status indicating a defect of the block and so forth. However, explanation for the information stored in the other area of the redundant area 26 is omitted because they are not important to the present invention.

As described above, because each page is composed of the user area 25 of 512 bytes and the redundant area 26 of 16 bytes, each page includes 8×(512 bytes+16 bytes)=4224 flash memory cells.

Among 8192 physical blocks in each flash memory chip 2-0 to 2-3, 8000 physical blocks are used as "actual use blocks" which can store the user data and the remaining 192 physical blocks are used as "redundant blocks." The redundant blocks are free blocks which are used in the data write operation. The address space of the flash memory chips 2-0 to 2-3 is formed by only the actual use blocks. If a defect arises in a certain physical block so that the physical block becomes a defect block, the number of redundant blocks are decreased as same as the number of the defect blocks.

Four actual use blocks each selected from different flash memory chips 2-0 to 2-3 constitutes "a virtual block" which the four actual use blocks are virtually combined. Therefore, 8000 virtual blocks composed of virtual blocks #0 to #7999 are formed in maximum. In this embodiment, top two virtual blocks (virtual blocks #0 and #1) are called "vertical writing virtual blocks" and the remaining virtual blocks (virtual blocks #2 to #7999) are called "lateral writing virtual blocks" among 8000 virtual blocks. The vertical writing virtual blocks corresponds to an area including a part in which a top of the host address is assigned, a FAT (file allocation table) and so forth are stored in the area in general. For this reason, data writing to small sectors (pages) in unit in the vertical writing virtual blocks are frequently performed compared with the lateral writing virtual blocks.

FIG. 6 is a schematic diagram showing the mapping example of the virtual block.

In the mapping example shown in FIG. 6, the physical block #150 in the flash memory chip 2-0, the physical block #6811 in the flash memory chip 2-1, the physical block #8191 in the flash memory chip 2-2, and the physical block #3048 in the flash memory chip 2-3 are virtually combined to form one virtual block. In this embodiment, four physical blocks constituting one virtual block are necessary to belong to different flash memory chips one another. Thus, a maximum of 8000 virtual blocks are constituted.

FIG. 7 is a schematic diagram showing the structure of the virtual pages constituting the virtual block shown in FIG. 6.

As shown FIG. 7, the virtual block is treated as single block constituted of 128 virtual pages including the virtual pages #0 to #127. 32 physical pages constitutes the physical block #150 are assigned to #4i (i is a physical page number) as virtual page numbers; 32 physical pages constitutes the physical block #6811 are assigned to #4i+1 as virtual page numbers; 32 physical pages constitutes the physical block #8191 are assigned to #4i+2 as virtual page numbers; and 32 physical pages constitutes the physical block #3048 are assigned to #4i+3 as virtual page numbers. Details are explained later but these virtual page numbers correspond to lower 7 bits of the host address.

A relationship between a virtual block and four physical blocks constituting the virtual block will now be explained.

As described above, in this embodiment a maximum of 8000 virtual blocks are constituted by physical blocks included in the flash memory chips 2-0 to 2-3. Relationships between each 8000 virtual block and four physical blocks constituting the corresponding virtual block are memorized in the address translation table 31 formed in the SRAM work area 8.

FIG. 8 is a schematic diagram showing the data structure of the address translation table 31.

As shown in FIG. 8, the address translation table 31 has 8000 virtual block indicating areas including the virtual block indicating areas #0 to #7999 disposed in line in this order. Each virtual block indicating area is constituted of four cells including the cells #j-0 to #j-3 (j is a virtual block address) and four flags including the flags #j-0 to #j-3. For example, the virtual block indicating area #0 is constituted of the cells #0-0 to #0-3 and flags #0-0 to #0-3; the virtual block indicating area #1 is constituted of the cells #1-0 to #1-3 and flags #1-0 to #1-3. Thus, the address translation table 31 includes 32000 cells and 32000 flags. A slot #0 which is constituted of the cells #j-0 and the flags #j-0 corresponds to the flash memory chip 2-0; a slot #1 which is constituted of the cells #j-1 and the flags #j-1 corresponds to the flash memory chip 2-1; a slot #2 which is constituted of the cells #j-2 and the flags #j-2 corresponds to the flash memory chip 2-2; and a slot #3 which is constituted of the cells #j-3 and the flags #j-3 corresponds to the flash memory chip 2-3.

The addresses of the physical blocks (physical block addresses) which constitutes each physical block are stored in the corresponding cells #j-0 to #j-3. The physical block address indicates the block number assigned for the corresponding physical block using 13 bits in binary code. For example, assuming that the virtual block shown in FIGS. 6 and 7 is the virtual block #0, "0000010010110B", "1101010011011B", "1111111111111B", and "0101111101000B" are stored in the cells #0-0 to #0-3 as the physical block addresses, respectively because the virtual block #0 is constituted of the physical blocks #150, #6811, #8191, and #3048.

The flags #j-0 to #j-3 included in each virtual block indicating area indicate whether the content of the corresponding cell is valid or invalid. Specifically, when the flag indicates "1", the content of the corresponding cell is valid; and when the flag indicates "0", the content of the corresponding cell is invalid. Therefore, the content of the cell where the corresponding flag indicates "0" is invalid.

Among 8000 virtual block indicating areas constituting the address translation table 31, the virtual block indicating areas #0 and #1 correspond to the vertical writing virtual blocks and the virtual block indicating areas #2 and #7999 correspond to the lateral writing virtual blocks.

As described above, because the address translation table 31 is constituted of 32000 cells in which 13 bits data (physical block address) should be stored and 32000 flags in which 1 bit data should be stored, the address translation table 31 occupies 64K bytes area in the SRAM work areas 8.

The address translation table 31 is prepared as follows:

In the top page (physical page #0) of the physical blocks in which the user data are stored, the virtual block address is stored in the virtual block address storing area 28 to indicate that the physical block itself belongs to which virtual block. The virtual block addresses stored in the top page (physical page #0) of the physical blocks are read under the control of the microprocessor 6 via the flash memory interface block 10.

In the free block which is already block erased, the virtual block addresses stored in the virtual block address storing area 28 should be "all 1 (1111111111111B)". Specifically, the virtual blocks are only composed of #0

(0000000000000B) to #7999 (1111100111111B) and therefore such the physical block can be decided as a free block that its virtual block address is "all 1 (1111111111111B)". In other words, when the virtual block address stored in the virtual block address storing area 28 is any one of "0000000000000B" to "1111100111111B", the virtual block address is valid address.

In the case where the virtual block address which is read from the redundant area 26 of the top page (physical page #0) by the microprocessor 6 is not "all 1 (1111111111111B)" but valid address, the physical block address of the physical block from which the virtual block address is read is stored in the cell designated by the chip number (#0 to #3) and the read virtual block address. For example, if the virtual block address which is read from the physical block #12 which belongs to the flash memory chip 2-0 is "123", "12" is stored as the physical block address in the cell #123-0 and "1" is stored in the corresponding flag #123-0.

Such an operation is performed for each physical block which contains the user data. Then, the preparing of the address translation table 31 is finished.

Next, the data structure of the write queue 32 stored in the SRAM work area 8 will be explained.

FIG. 9 is a schematic diagram showing the data structure of the write queue 32.

As shown in FIG. 9, the write queue 32 is constituted of six queue sets including the queue sets #0 to #5 each of which is constituted of four queues including the queues #k-0 to #k-3 (k is a queue set number). For example, the queue set #0 is constituted of the queues #0-0 to #0-3; and the queue set #1 is constituted of the queues #1-0 to #1-3. Therefore, the write queue 32 includes 24 queues. The queues #k-0 correspond to the flash memory chip 2-0; the queues #k-1 correspond to the flash memory chip 2-1; the queues #k-2 correspond to the flash memory chip 2-2; and the queues #k-3 correspond to the flash memory chip 2-3.

The physical block addresses of such the physical block that all flash memory cells constituting the user area 25 are in the erased state (free block) are stored in the queues #k-0 to #k-3 of the queue sets #0 to #5. For example, in the case where the physical block #153 which belongs to the flash memory chip 2-0 is to be registered in the write queue 32, the physical block address, "0000010011001B (153)", is stored in any one of the queues #0-0 to #5-0. Similarly, in the case where the physical block #6552 which belongs to the flash memory chip 2-2 is to be registered in the write queue 32, the physical block address, "1100110011000B (6652)", is stored in any one of the queues #0-2 to #5-2.

Therefore, at most six physical block addresses of the free blocks according to each flash memory chip 2-0 to 2-3 are registered in the write queue 32. Therefore, at most six queue sets #0 to #5 are prepared.

The generation of the write queue 32 is performed under the control of the microprocessor 6 during the generation of the address translation table 31. The physical block addresses to be registered in the write queue 32 are selected from the redundant blocks awaiting the data write operation.

Next, the data read operations and data write operations of the flash memory system 1 will be explained in this order.

At first, the data read operations of the flash memory system 1 will be explained.

Although in the data read operation the user data is read from the flash memory chips 2-0 to 2-3 by using an internal address into which the host address is converted, the address translations are performed by different manners whether the virtual block to be accessed is the vertical writing virtual block or the lateral writing virtual block. Details of the data read operations for the vertical writing virtual block and the lateral writing virtual block will be explained separately.

Data Read Operation #1 (in case of reading data from the lateral writing virtual block)

The data read operation #1 will be explained for the case where the external read command, a kind of external command, and the host address "00000111111111100000B", for example, are supplied to the flash memory system 1 via the bus 14, the connector 4, and the bus 13 from the host computer 5.

First, when the host address and the external read command are supplied to the controller 3, they are temporarily stored in the task file register (not shown) of the host interface block 7.

Next, the host address stored in the task file register is checked for whether it is invalid, for example, is an nonexistent address, an invalid address, or the like, by the host interface block 7.

On one hand, when the check finds the host address stored in the task file register to be valid, the host address is converted into the internal address by using the address translation table 31. On the other hand, when the host address is found to be invalid, the error register (not shown) of the host interface block 7 is set, so that the host computer 5 can ascertain occurrence of any error by referring to the error register.

Figure 10:
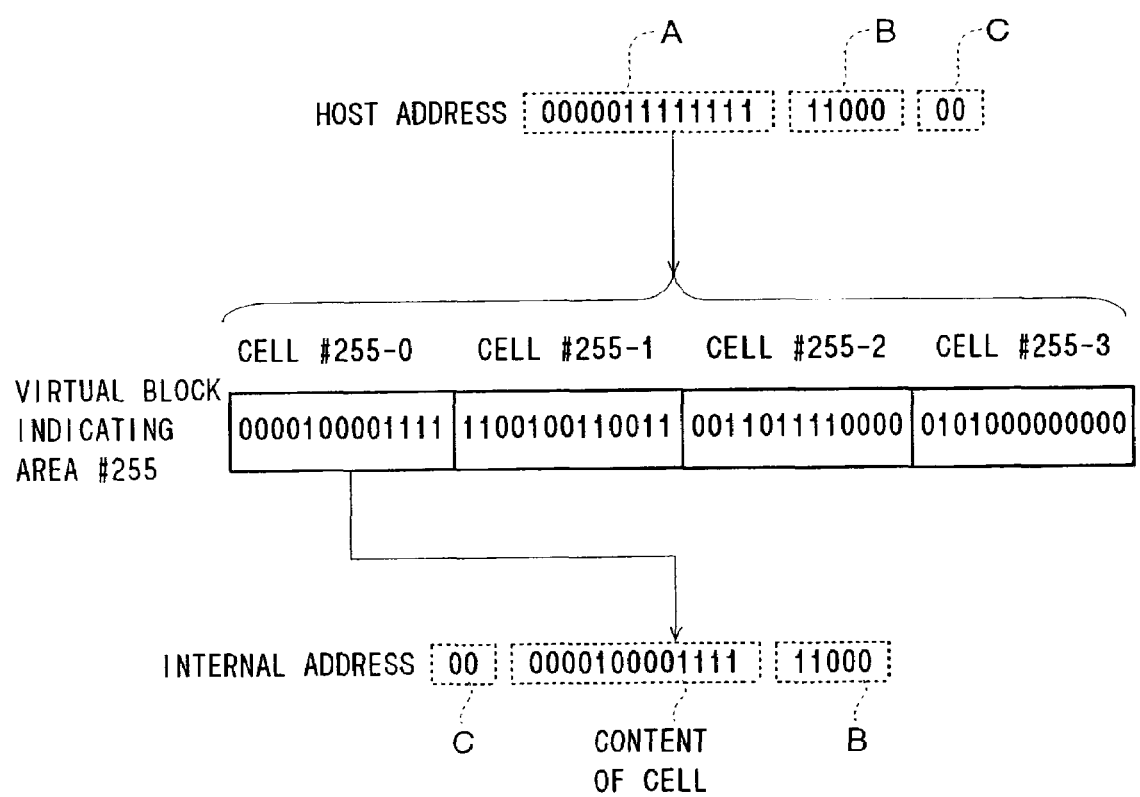
FIG. 10 is a schematic diagram showing the translation method to obtain an internal address using the address translation table 31 during the data read operation #1.

The translation method to obtain an internal address using the address translation table 31 in the case where the virtual block to be accessed is the lateral writing virtual block with reference to FIG. 10.

In FIG. 10, "A" indicates upper 13 bits of the host address, "B" indicates 5 bits composed of the upper 14th bit to the upper 18th bit of the host address, and "C" indicates lower 2 bits of the host address, expediently.

First, upper 13 bits (A) of the host address are extracted from the host address of 20 bits, and then one of the virtual block indicating areas constituting the address translation table 31 is selected under the control of the microprocessor 6. In the exemplified case, because the extracted 13 bits (A) of the host address are "0000011111111B (255)", the virtual block indicating area #255 is selected. In this time, the virtual block to be accessed is detected as the lateral writing virtual block.

When the virtual block to be accessed is detected as the lateral writing virtual block, among four cells and four flags constituting the virtual block indicating area #255, the contents of the one cell and one flag whose branch numbers are coincident with the lower 2 bits (C) of the host address are read out under the control of the microprocessor 6. In the exemplified case, because the lower 2 bits (C) of the host address are "00B (0)", the cell and flag from which the contents are read out are the cell #255-0 and flag #255-0. As shown in FIG. 10, assume that the content of the cell #255-0 is "0000100001111B". Further, because this operation is the data read operation, the content of the flag #255-0 should be "1 (valid)". If the content of the flag #255-0 is "0 (invalid)", this operation becomes an error.

Next, the lower 2 bits (C) of the host address, the content read from the cell, and the 5 bits (B composed of the upper 14th bit to the upper 18th bit of the host address are combined in this order. The combined address is the internal address. In the exemplified case, because the lower 2 bits (C) of the host address are "00B", the content read from the cell is "0000100001111B", and the 5 bits (X composed of the upper 14th bit to the upper 18th bit of the host address is "11000B", "00000100001111111000B" as the internal address can be obtained as shown in FIG. 10.

Then, the address translation from the host address to the internal address is completed.

In accordance with the external read command is stored in the task file registers (not shown) included in the host interface block 7, the registers (not shown) included in the flash sequencer block 12 are set under the control of the microprocessor 6. This operation is performed as follows:

First, the internal read command which is a kind of internal command, is set in the predetermined registers (not shown) included in the flash sequencer block 12 under the control of the microprocessor 6. Further, the internal address of 20 bits is set in other registers (not shown) included in the flash sequencer block 12 under the control of the microprocessor 6.

When the above setting for the registers included in the flash sequencer block 12 is completed, the sequential data read operation is started by the flash sequencer block 12. The sequential data read operation is performed by the flash sequencer block 12 as follows:

First, the flash sequencer block 12 directs the flash memory interface block 10 to activate one of the chip selection signals #0 to #3 corresponding to the flash memory chip to be accessed based on the upper two bits of the internal address stored in the prescribed register. In the exemplified case, because the upper two bits of the internal address is "00B (0)", the flash memory chip to be accessed is the flash memory chip 2-0. Therefore, the chip selection signal #0 is activated and access to the flash memory chip 2-0 for reading data is enabled. The other chip selection signals #1 to #3 are kept in the inactive state.

Next, the flash sequencer block 12 directs the flash memory interface block 10 to send the lower 18 bits of the internal address, which are "000010000111111000B", and the internal read command stored in the prescribed registers to the bus 15. Although the lower 18 bits of the internal address and the internal read command are provided in common to the flash memory chips 2-0 to 2-3 via the bus 15, they are only valid for the flash memory chip 2-0 because the chip selection signal #0 is in the active state while the other the chip selection signals #1 to #3 are in the inactive state.

As a result, the flash memory chip 2-0 can read data stored at the lower 18 bits of the internal address "000010000111111000B". Among the lower 18 bits of the internal address, the upper 13 bits are used to select the physical block to be accessed and the lower 5 bits are used to select the physical page to be accessed included in the selected physical block. In the exemplified case, the upper 13 bits is "0000100001111B (271)" and the lower 5 bits is "11000B (24)", the physical block #271 and the physical page #24 are selected. That is, the flash memory chip 2-0 reads data stored at the physical page #24 of the physical block #271. In this read operation, not only the user data stored in the user area 25 but also various additional information stored in the redundant area 26 are read out.

In this embodiment, because four physical blocks constitutes one virtual block as mentioned above by using FIG. 7, the physical page #24 of the physical block #271 which belongs to the flash memory chip 2-0 corresponds to the virtual page #96 of the virtual block #255.

By the above operations, the user data and additional information read from the flash memory chip 2-0 are supplied to the flash memory interface block 10 via the bus 15. When the flash memory interface block 10 receives the user data and additional information, the error correction code included in the additional information is extracted and the user data and the error correction code are supplied to the ECC block 11 under the control of the flash sequencer block 12. When the user data and the error correction code are supplied to the ECC block 11, the ECC block 11 judges based on the error correction code whether or not the user data includes any error. As a result, if the ECC block 11 judges that the user data does not include any error, the ECC block 11 supplies the user data unmodified to the buffer 9. If the ECC block 11 judges that the user data includes an error, the ECC block 11 corrects the user data based on the error correction code and supplies the corrected user data to the buffer 9. Then the error-free user data are temporarily stored in the buffer 9, whereby the sequential read operation by the flash sequencer block 12 is completed.

Then, the user data stored in the buffer 9 are transferred to the host computer 5 via the host interface block 7, the bus 13, the connector 4, and the bus 14 under the control of the microprocessor 6.

This completes the data read operation #1.

As described above, in the case where the virtual block to be accessed is the lateral writing virtual block, because the lower 2 bits (C) of the host address are assigned to the upper 2 bits of the internal address and the 5 bits (b) composed of the upper 14th bit to the upper 18th bit of the host address are assigned to the lower 5 bits of the internal address, the successive host addresses whose lower 7 bits are "0000000B" to "1111111B" are assigned to the successive virtual pages #0 to #127 of the same virtual block, respectively.

Next, the data read operation, in the case where the virtual block to be accessed is the vertical writing virtual block, will be explained.

Data Read Operation #2 (in case of reading data from the vertical writing virtual block)

The data read operation #2 will be explained for the case where the external read command, a kind of external command, and the host address "00000000000001010101B", for example, are supplied to the flash memory system 1 via the bus 14, the connector 4, and the bus 13 from the host computer 5.

First, when the host address and the external read command are supplied to the controller 3, the host address is checked for whether it is valid or invalid by the host interface block 7 as described above. When the check finds the host address to be valid, the host address is converted into the internal address by using the address translation table 31.

Figure 11:
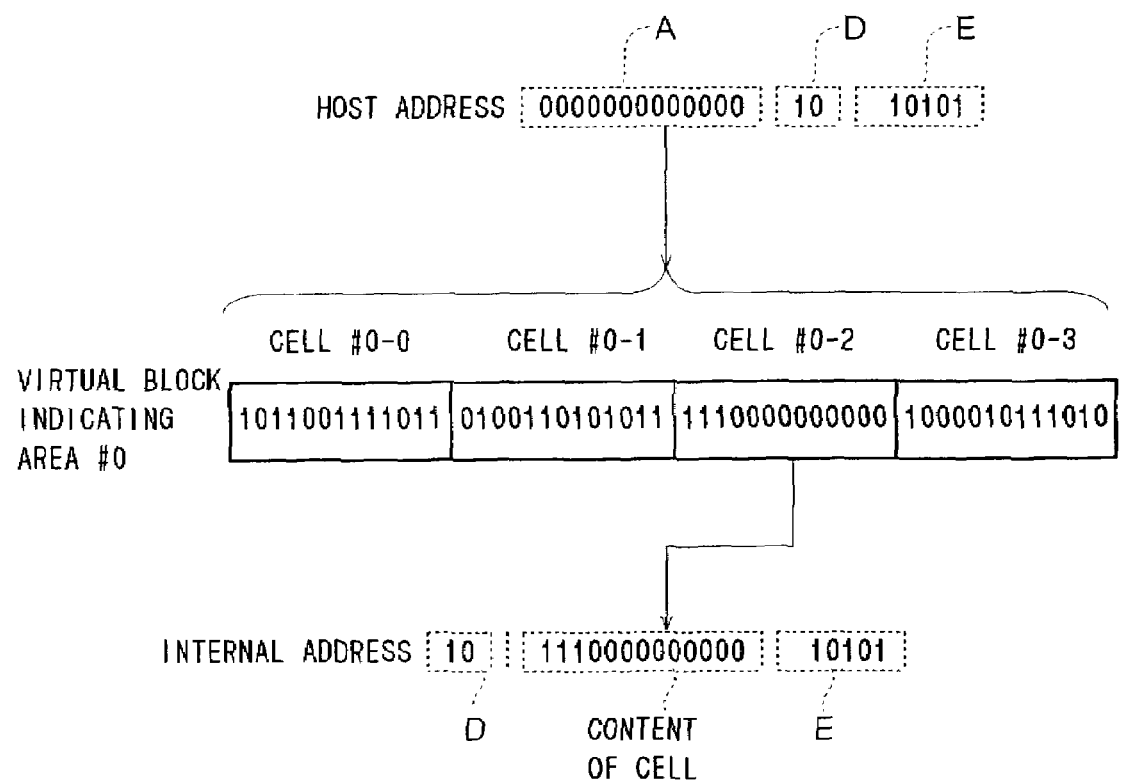
FIG. 11 is a schematic diagram showing the translation method to obtain an internal address using the address translation table 31 during the data read operation #2.

The translation method to obtain an internal address using the address translation table 31 in the case where the virtual block to be accessed is the vertical writing virtual block with reference to FIG. 11.

In FIG. 11, "A" indicates upper 13 bits of the host address, "D" indicates 2 bits of the upper 14th bit and the upper 15th bit of the host address, and "E" indicates lower 5 bits of the host address, expediently.

First, upper 13 bits (A) of the host address are extracted from the host address of 20 bits, and then one of the virtual block indicating areas constituting the address translation table 31 is selected under the control of the microprocessor 6. In the exemplified case, because the extracted 13 bits (A) of the host address are "0000000000000B (0)", the virtual block indicating area #0 is selected. In this time, the virtual block to be accessed is detected as the vertical writing virtual block.

When the virtual block to be accessed is detected as the vertical writing virtual block, among four cells and four flags constituting the virtual block indicating area #0, the contents of the one cell and one flag whose branch numbers are coincident with the 2 bits (D) of the upper 14th bit and the upper 15th bit of the host address are read out under the control of the microprocessor 6. In the exemplified case, because the 2 bits (D) of the host address are "10B (2)", the cell and flag from which the contents are read out are the cell #0-2 and flag #0-2. As shown in FIG. 11, assume that the content of the cell #0-2 is "1110000000000B". Further, because this operation is also the data read operation, the content of the flag #0-2 should be "1 (valid)". If the content of the flag #0-2 is "0 (invalid)", this operation becomes an error.

Next, the 2 bits (D) of the upper 14th bit and the upper 15th bit of the host address, the content read from the cell, and the lower 5 bits (E) of the host address are combined in this order. The combined address is the internal address. In the exemplified case, because the 2 bits (D) of the upper 14th bit and the upper 15th bit of the host address is "10B", the content read from the cell is "1110000000000B", and the lower 5 bits (B) of the host address is "10101B", "10111000000000010101B" as the internal address can be obtained as shown in FIG. 11.

Then, the address translation from the host address to the internal address is completed.

As a apparent from the foregoing, in the case where the virtual block to be accessed is the vertical writing virtual block, the address translation is different from the case where the virtual block to be accessed is the lateral writing virtual block.

After the address translation from the host address to the internal address is completed, the same operation will be performed as the data read operation #1. In the exemplified case, because the upper 2 bits of the internal address is "10B (2)", the flash memory chip to be accessed is the flash memory chip 2-2. Therefore, the chip selection signal #2 is activated. Further, because the lower 18 bits of the internal address are "111000000000010101B", the flash memory chip 2-2 is performed to read data stored at the lower 18 bits of the internal address "111000000000010101B". Among the lower 18 bits of the internal address, the upper 13 bits are used to select the physical block to be accessed and the lower 5 bits are used to select the physical page to be accessed included in the selected physical block. In the exemplified case, the upper 13 bits is "1110000000000B (7168)" and the lower 5 bits is "10101B (21)", the physical block #7168 and the physical page #21 are selected. That is, the flash memory chip 2-2 reads data stored at the physical page #21 of the physical block #7168.

In this embodiment, because four physical blocks constitutes one virtual block as mentioned above by using FIG. 7, the physical page #21 of the physical block #7168 which belongs to the flash memory chip 2-2 corresponds to the virtual page #0 of the virtual block #86.

By the above operations, the user data and additional information read from the flash memory chip 2-2 are supplied to the ECC block 11 and the error-free user data are temporarily stored in the buffer 9. Then, the user data stored in the buffer 9 are transferred to the host computer 5 via the host interface block 7, the bus 13, the connector 4, and the bus 14 under the control of the microprocessor 6.

This completes the data read operation #2.

As described above, in the case where the virtual block to be accessed is the vertical writing virtual block, because the 2 bits (D) of the upper 14th bit and the upper 15th bit of the host address are assigned to the upper 2 bits of the internal address and the lower 5 bits (E) of the host address are assigned to the lower 5 bits of the internal address, the successive host addresses whose lower 7 bits are "0000000B" to "0011111B" are assigned to the successive physical pages #0 to #31 of the same physical block which belongs to the flash memory chip 2-0, the successive host addresses whose lower 7 bits are "0100000B" to "0111111B" are assigned to the successive physical pages #0 to #31 of the same physical block which belongs to the flash memory chip 2-1, the successive host addresses whose lower 7 bits are "1000000B" to "1011111B" are assigned to the successive physical pages #0 to #31 of the same physical block which belongs to the flash memory chip 2-2, and the successive host addresses whose lower 7 bits are "1100000B" to "1111111B" are assigned to the successive physical pages #0 to #31 of the same physical block which belongs to the flash memory chip 2-3.

The purpose that the different address translation methoda are used between the case where the virtual block to be accessed is the lateral writing virtual block and the case where the virtual block to be accessed is vertical writing virtual block will be apparent from the explanation of the various data write operations of the flash memory system 1 explained later.

Next, the data write operations of the flash memory system 1 will be explained.

Although in the data write operations the address translations are performed by different manners not only whether the virtual block to be accessed is the vertical writing virtual block or the lateral writing virtual block but also whether the virtual block to be accessed does not exist (new data writing) or the virtual block to be accessed already exists (data overwriting). Therefore details of the various data write operations will be explained in each case.

Data Write Operation #1 (in case of writing data to the free block (host address corresponds to the lateral writing virtual block))

In case of writing data to the free block, i.e., in case of the new data writing, when the address corresponds to the lateral writing virtual block, a generation of the virtual block, redundant data writing to the virtual pages #0 to #3 of the generated virtual block, and user data writing to the certain virtual page of the generated virtual block are performed.

The data write operation #1 will be explained for the case where the external write command, a kind of external command, the successive host addresses "00010101010101000100B" to "00010101010101000111B" in which no data are assigned, for example, and user data to be written are supplied to the flash memory system 1 via the bus 14, the connector 4, and the bus 13 from the host computer 5. Hereinafter, these successive host addresses are referred to as the host addresses #0 to #3.

First, when the host addresses #0 to #3 and the external write command are supplied to the controller 3, the host addresses #0 to #3 and the external write command are temporarily stored in the task file register (not shown) of the host interface block 7. Further, when the user data to be written are supplied to the controller 3, they are transferred to the ECC block 11 under the control of the microprocessor 6. In response to receipt of the user data, the ECC block 11 analyzes the user data to generate the error correction code and the ECC block 11 temporarily stores it. On the other hand, the user data are stored in the buffer 9.

Next, the host addresses #0 to #3 stored in the task file register are checked for whether they are invalid, for example, are nonexistent addresses, invalid addresses, or the like, by the host interface block 7.

On one hand, when the check finds the host addresses #0 to #3 stored in the task file register to be valid, the host addresses #0 to #3 are converted into the internal addresses by using the write queue 32. On the other hand, when the host addresses #0 to #3 are found to be invalid, the error register (not shown) of the host interface block 7 is set, so that the host computer 5 can ascertain occurrence of any error by referring to the error register.

Figure 12:
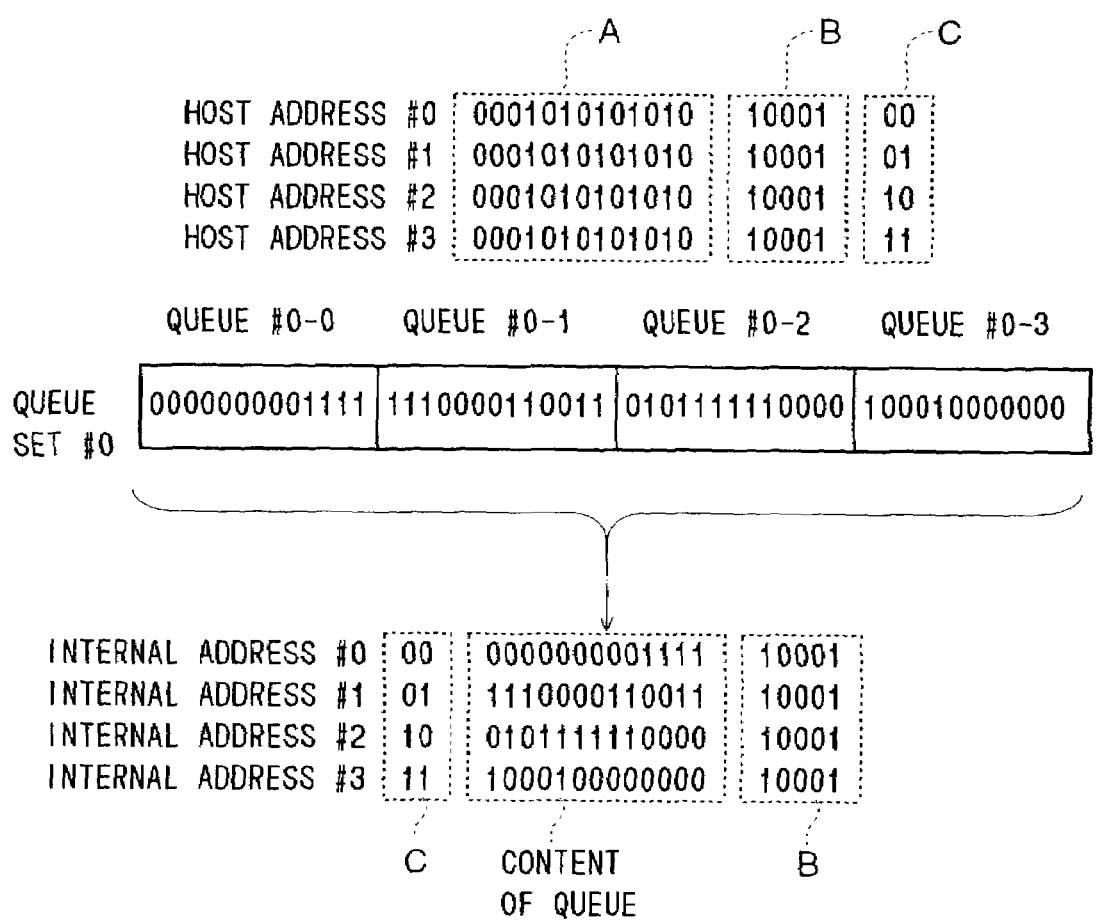
FIG. 12 is a schematic diagram showing the generation method to obtain an internal addresses using the write queue 32 during the data write operation #1.

FIG. 12 is a schematic diagram showing the generation method to obtain an internal addresses using the write queue 32 during the data write operation #1.

As shown in FIG. 12, in the exemplified case, because the upper 13 bits (A) of the host addresses #0 to #3 are "0001010101010B (682)", the virtual block indicating area #682 is selected. In this time, the virtual block to be accessed is detected as the lateral writing virtual block.

When the virtual block to be accessed is detected as the lateral writing virtual block, the contents of the virtual block indicating area #682 of the address translation table 31 stored in the SRAM work area 8 are read out under the control of the microprocessor 6. Because the data write operation #1 is the new data writing operation, i.e., is the operation to assign new data to the host address corresponding to the virtual block in which no data are stored, every contents of the flags #682-0 to #682-3 included in the virtual block indicating area #682 should be "0 (invalid)". If the contents of the flags #682-0 to #682-3 are "1 (valid)", the data write operation should be the "data overwriting". Details of the data overwriting will be explained later.

Next, one of the queue sets #0 to #5 constituting the write queue 32, the queue set #0 for example, is selected and the contents stored in the each queue #0-0 to #0-3 constituting the selected queue set #0 are read out under the control of the microprocessor 6. As mentioned above, the contents of the each queue are the physical block addresses of the free blocks. As shown in FIG. 12, assume that the contents of the queues #0-0 to #0-3 are "0000000001111B (15)", "1110000110011B (7219)", "0101111110000B (3056)", and "1000100000000B (4352)".

When the contents of the queues #0-0 to #0-3 are read out, they are stored in the cells #682-0 to #682-3 included in the virtual block indicating area #682, respectively and corresponding flags #682-0 to #682-3 are changed from "0 (invalid)" to "1 (valid)". Therefore, the generation of the virtual block is completed.

Then as shown in FIG. 12, the lower 2 bits (C) of the host addresses #0 to #3, the contents read from the corresponding queues, and the 5 bits (B) composed of the upper 14th bit to the upper 18th bit of the host addresses #0 to #3 are combined in this order under the control of the microprocessor 6. The combined addresses are the internal addresses #0 to #3, respectively. In the exemplified case, because the lower 2 bits (C) of the host addresses #0 to #3 are "00B" to "11B", respectively, the contents read from the queues are "0000000001111B", "1110000110011B", "0101111110000B", and "1000100000000B", respectively, and the every 5 bits (B) composed of the upper 14th bit to the upper 18th bit of the host addresses #0 to #3 are "10001B", the values of the four internal addresses #0 to #3 become the values shown in FIG. 12.

Then, the address translation from the host addresses #0 to #3 to the internal addresses #0 to #3 is completed. As explained earlier, the upper 2 bits of the internal address indicate the flash memory chip number to be accessed, the 13 bits composed of the upper 3rd bit to the upper 15th bit of the internal address indicate the physical block address to be accessed, and the lower 5 bits of the internal address indicate the physical page address to be accessed. Therefore, the physical page designated by the internal address #0 is the physical page #17 of the physical block #15 which belongs to the flash memory chip 2-0; the physical page designated by the internal address #1 is the physical page #17 of the physical block #7219 which belongs to the flash memory chip 2-1; the physical page designated by the internal address #2 is the physical page #17 of the physical block #3056 which belongs to the flash memory chip 2-2; and the physical page designated by the internal address #3 is the physical page #17 of the physical block #4352 which belongs to the flash memory chip 23.

In accordance with the external write command is stored in the task file registers (not shown) included in the host interface block 7, the registers (not shown) included in the flash sequencer block 12 are set under the control of the microprocessor 6. This operation is performed as follows:

First, the internal write command which is a kind of internal command, is set in the predetermined registers (not shown) included in the flash sequencer block 12 under the control of the microprocessor 6. Further, the internal addresses #0 to #3 are set in other registers (not shown) included in the flash sequencer block 12 under the control of the microprocessor 6.

When the above setting for the registers included in the flash sequencer block 12 is completed, the sequential data write operations are started by the flash sequencer block 12. In the sequential data write operations, writing of the various redundant data to the virtual pages #0 to #3 of the virtual block #682 and writing the user data and various redundant data to the virtual pages #68 to #71 of the virtual block #682 are performed in this order.

Figure 13:
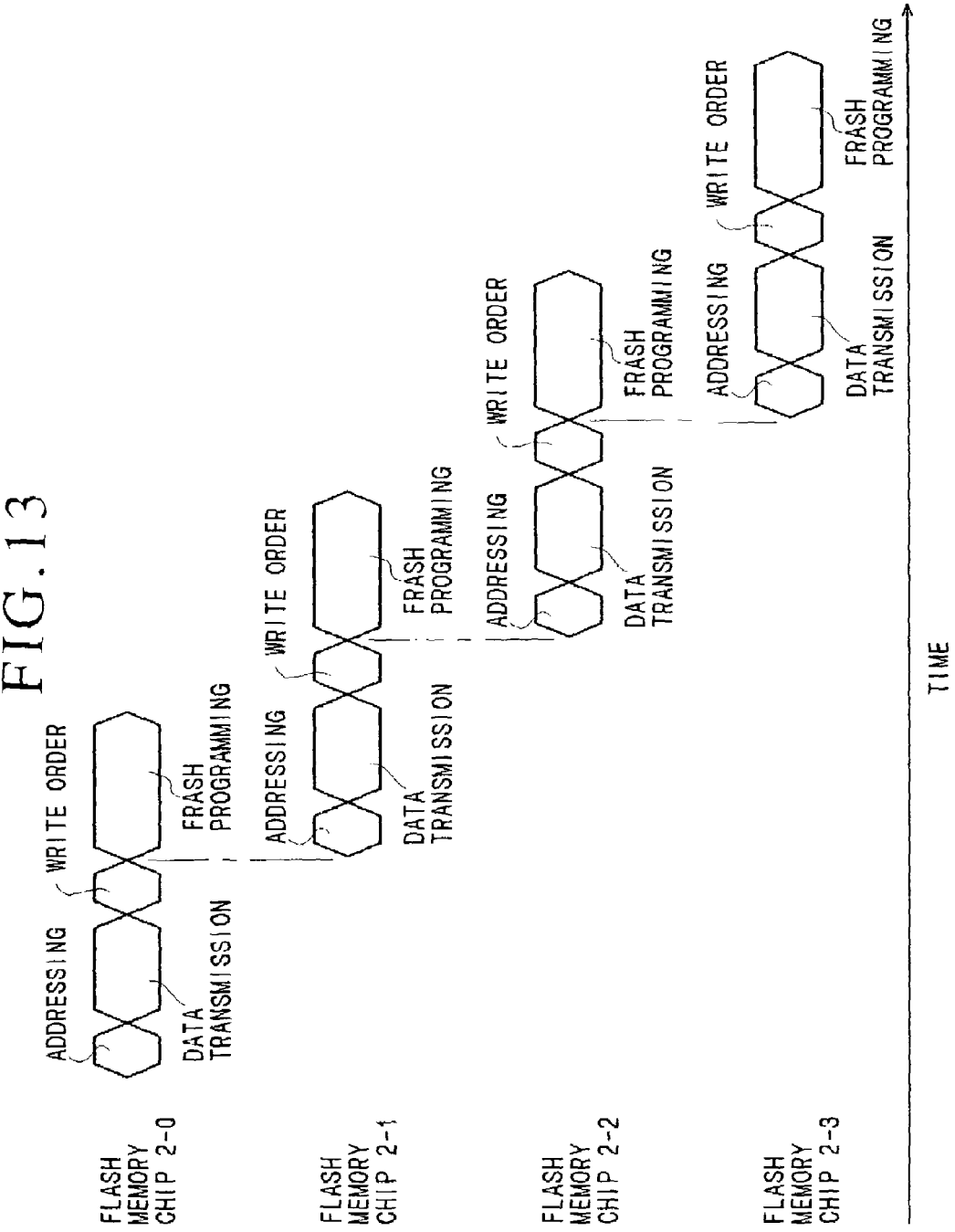
FIG. 13 is a timing chart showing a series of data write operations by a flash sequencer block 12 during the data write operation #1.

FIG. 13 is a timing chart showing the sequential data write operations for the virtual pages #0 to #3 of the virtual block #682.

At first, the flash sequencer block 12 generates the internal address #5 which corresponds to the virtual page #0 of the virtual block #682. The internal address #5 which corresponds to the virtual page #0 of the virtual block #682 also corresponds to the physical page #0 of the physical block #15 included in the flash memory chip 2-0 and its value is "000000000000111100000B".

Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the internal address #5. In the exemplified case, because the upper 2 bits of the internal address #5 are "00B (0)", the chip selection signal #0 is activated. Therefore, access of the flash memory chip 2-0 is enabled. The other chip selection signals #1 to #3 are kept in the inactive state.

Next, the flash sequencer block 12 directs the flash memory interface block 10 to send the lower 18 bits of the internal address #5, which is "000000000111100000B", and the internal write command stored in the prescribed registers (not shown) to the bus 15. Although the lower 18 bits of the internal address #5 and the internal write command are provided in common for the flash memory chips 2-0 to 2-3 via the bus 15, they are only valid for the flash memory chip 2-0 because the chip selection signal #0 is in the active state while the other the chip selection signals #1 to #3 are in the inactive state (addressing).

As a result, the flash memory chip 2-0 is enabled to write data into the physical page designated by the lower 18 bits of the internal address #5, "000000000111100000B".

Next, the data to be written to the virtual page #0 of the virtual block #682 is supplied to the bus 15 via the flash memory interface block 10 under the control of the flash sequencer block 12. The virtual page #0 of the virtual block

682 corresponds to the physical page #0 of the physical block #15 included in the flash memory chip 2-0; and the data to be written thereto are composed of the virtual block address and other additional information each of which is the data to be stored in the redundant area 26. The value of the virtual block address to be stored in the redundant area 26 is "0001010101010B (682)". No data are stored in the other areas, the user area 25 and the error correction code storing area 27 of the redundant area 26, of the physical page #0 of the physical block #15 included in the flash memory chip 2-0. However, the data writing is performed to each physical page as a unit. Therefore, no data writing does not performed for the above areas in which no data are to be stored, but the data of "all 1" is stored in the areas.

Although the virtual block address and other data to be stored in the redundant area 26 are also supplied in common to the flash memory chips 2-0 to 2-3 via bus 15, they are only valid for the flash memory chip 2-0 because only the chip selection signal #0 is in the active state (data transmission).

After the virtual block address and so forth are transferred to the flash memory chip 2-0 which is enabled to write data, the transferred data are temporarily stored in the register (not shown) employed in the flash memory chip 2-0.

Next, the flash sequencer block 12 issues the internal write command stored in the prescribed register to the flash memory chip 2-0 (write order).

In response to the write order, the flash memory chip 2-0 stores the data temporarily stored in the register to the address designated by the addressing operation (flash programming). Therefore, the data temporarily stored in the register are written in the page designated by the lower 18 bits of the internal address #5, "000000000111100000B", which is the physical page #0 of the physical block #15 included in the flash memory chip 2-0. The physical page #0 of the physical block #15 included in the flash memory chip 2-0 corresponds to the virtual page #0 of the virtual block #682.

While the flash programming is performed by the flash memory chip 2-0, the flash sequencer block 12 generates the internal address #6 which is corresponds to the virtual page #1 of the virtual block #682 and the flash sequencer block 12 stores the same data stored in the virtual page #1 of the virtual block #682 to the physical page corresponding to the internal address #6. The internal address #6 which corresponds to the virtual page #1 of the virtual block #682 also corresponds to the physical page #0 of the physical block #7219 included in the flash memory chip 2-1 and its value is "0111100001100110000B".

Such write operations are also performed for the virtual pages #2 and #3 of the virtual block #682 by using the internal address #7 and #8. Therefore, the same data are stored in the redundant areas 26 of the virtual pages #0 to #3 of the virtual block #682. The virtual page #2 of the virtual block #682 corresponds to the physical page #0 of the physical block #682 included in the flash memory chip 2-2; and the virtual page #3 of the virtual block #682 corresponds to the physical page #0 of the physical block #4352 included in the flash memory chip 2-3.

When the sequential data write operations for the virtual pages #0 to #3 of the virtual block #682 are completed, the sequential data write operations for the virtual pages #68 to #71 of the virtual block #682 to store the user data and the various redundant data are performed.

The sequential data write operations for the virtual pages #68 to #71 of the virtual block #682 are also performed in accordance with the timing chart shown in FIG. 13. Details of the sequential data write operations for the virtual pages #68 to #71 of the virtual block #682 will be explained as follows:

At first, the flash sequencer block 12 selects the internal address #0 whose upper 2 bits is "00B (0)" among the internal addresses #0 to #3 stored in the prescribed registers and directs the flash memory interface block 10 to activate the one of the chip selection signals #0 to #3 corresponding to the flash memory chip to be accessed among the flash memory chips 2-0 to 2-3. In the exemplified case, because the upper 2 bits of the internal address #0 are "00B (0)", the chip selection signal #0 is activated. Therefore, access of the flash memory chip 2-0 is enabled. The other chip selection signals #1 to #3 are kept in the inactive state.

Next, the flash sequencer block 12 directs the flash memory interface block 10 to send the lower 18 bits of the internal address #5, which is "000000000111110001B", and the internal write command stored in the prescribed registers (not shown) to the bus 15. Although the lower 18 bits of the internal address #5 and the internal write command are provided in common for the flash memory chips 2-0 to 2-3 via the bus 15, they are only valid for the flash memory chip 2-0 because the chip selection signal #0 is in the active state while the other the chip selection signals #1 to #3 are in the inactive state (addressing).

As a result, the flash memory chip 2-0 is enabled to write data into the physical page designated by the lower 18 bits of the internal address #0, "000000000111110001B".

Next, among the data stored in the buffer 9, the user data and the additional information to be stored in the redundant area 26 including the error correction code corresponding to the host address #0 are supplied to the bus 15 via the flash memory interface block 10 under the control of the flash sequencer block 12. Among the additional information to be stored in the redundant area 26, the virtual block address has the same value as the virtual block address already stored in the virtual pages #0 to #3. Although the user data and the additional information including the error correction code are also supplied in common to the flash memory chips 2-0 to 2-3 via bus 15, they are only valid for the flash memory chip 2-0 because only the chip selection signal #0 is in the active state (data transmission).

After the user data and the additional information including the error correction code are transferred to the flash memory chip 2-0 which is enabled to write data, the transferred data are temporarily stored in the register (not shown) employed in the flash memory chip 2-0.

Next, the flash sequencer block 12 issues the internal write command stored in the prescribed register to the flash memory chip 2-0 (write order).

In response to the write order, the flash memory chip 2-0 stores the user data and the additional information including the error correction code temporarily stored in the register to the address designated by the addressing operation (flash programming). Therefore, the user data and the additional information including the error correction code temporarily stored in the register are written in the page designated by the lower 18 bits of the internal address #0, "000000000111110001B", which is the physical page #17 of the physical block #15 included in the flash memory chip 2-0. The physical page #17 of the physical block #15 included in the flash memory chip 2-0 corresponds to the virtual page #68 of the virtual block #682.

While the flash programming is performed by the flash memory chip 2-0, the flash sequencer block 12 selects the internal address #1 whose upper 2 bits is "01B (1)" from the internal addresses #0 to #3 stored in the prescribed registers and directs the flash memory interface block 10 to activate the chip selection signal #1 based on the upper 2 bits of the internal address #1. Therefore, the flash memory chip 2-0 is enabled to write data.

Next, the flash sequencer block 12 directs the flash memory interface block 10 to send the lower 18 bits of the internal address #1, which is "111000011001110001B", and the internal write command stored in the prescribed registers (not shown) to the bus 15. In this case, the internal write command are only valid for the flash memory chip 2-1 because the chip selection signal #1 is in the active state while the other the chip selection signals #0, #2, and #3 are in the inactive state (addressing).

Then, the data transmission and write order are performed for the flash memory chip 2-1, so that the user data and the additional information including the error correction code are written in the physical page designated by the internal address #1. In the exemplified case, because the lower 18 bits of the internal address #1 are "111000011001110001B", the user data and the additional information including the error correction code are written in the physical page #17 of the physical block #7219 included in the flash memory chip 2-1. The physical page #17 of the physical block #7219 included in the flash memory chip 2-1 corresponds to the virtual page #69 of the virtual block #682.

Such write operations are also performed by using the internal addresses #2 and #3. Therefore, the corresponding user data and the corresponding additional information including the error correction code are stored in the physical pages designated by the internal addresses #2 and #3. In the exemplified case, because the lower 18 bits of the internal address #2 are "010111111000010001B", the user data and the additional information including the error correction code which correspond to the internal address #2 are written in the physical page #17 of the physical block #3056 included in the flash memory chip 2-2. Similarly, because the lower 18 bits of the internal address #3 are "100010000000010001B", the user data and the additional information including the error correction code which correspond to the internal address #3 are written in the physical page #17 of the physical block #4352 included in the flash memory chip 2-3.

The physical page #17 of the physical block #3056 included in the flash memory chip 2-2 corresponds to the virtual page #70 of the virtual block #682. The physical page #17 of the physical block #4352 included in the flash memory chip 2-3 corresponds to the virtual page #71 of the virtual block #682.

In response to the fact that the physical block addresses stored in the queue set #0 of the write queue 32 have been changed from the physical block addresses of the free blocks to the physical block addresses of the used blocks, the microprocessor 6 selects other physical blocks among the redundant blocks and stores their physical block addresses to the queues #0-0 to #0-3.

Then, the sequential write operation by the flash sequencer block 12 is completed.

In the sequential write operation, it is important that the user data which correspond to the successive host addresses #0 to #3 have been written in the different physical blocks which are included in the flash memory chips 2-0 to 2-3 one another. As mentioned above, these four physical blocks constitute one virtual block #682. Therefore, the user data which correspond to the successive host addresses #0 to #3 have been written in the successive virtual pages #68 to #71 of the same virtual block #682.

In the exemplified case, although the virtual block address is written in not only the virtual pages #0 to #3 each of which corresponds to the top page of an associated one of physical blocks but also other virtual pages (virtual pages #68 to #71), the virtual block address can be omitted to write in the other virtual pages.

Data Write Operation #2 (in case of writing data to the free block (host address corresponds to the vertical writing virtual block))

In case of writing data to the free block, i.e., in case of the new data writing, when the address corresponds to the vertical writing virtual block, a generation of the partial virtual block, redundant data writing to the virtual pages #0 to #3 of the generated partial virtual block, and user data writing to the certain virtual page of the generated partial virtual block are performed.

The data write operation #2 will be explained for the case where the external write command, a kind of external command, the successive host addresses "00000000000010110000B" to "00000000000010110011B" in which no data are assigned, for example, and user data to be written are supplied to the flash memory system 1 via the bus 14, the connector 4, and the bus 13 from the host computer 5. Hereinafter, these successive host addresses are also referred to as the host addresses #0 to #3.

First, when the host addresses #0 to #3 and the external write command are supplied to the controller 3, these host addresses #0 to #3 are checked for whether they are valid or not by the host interface block 7 and the error correction codes for the user data are generated by the ECC block 11 as mentioned above. As a result, when the check finds the host addresses #0 to #3 to be valid, the host addresses #0 to #3 are converted into the internal addresses by using the address translation table 31.

Figure 14:
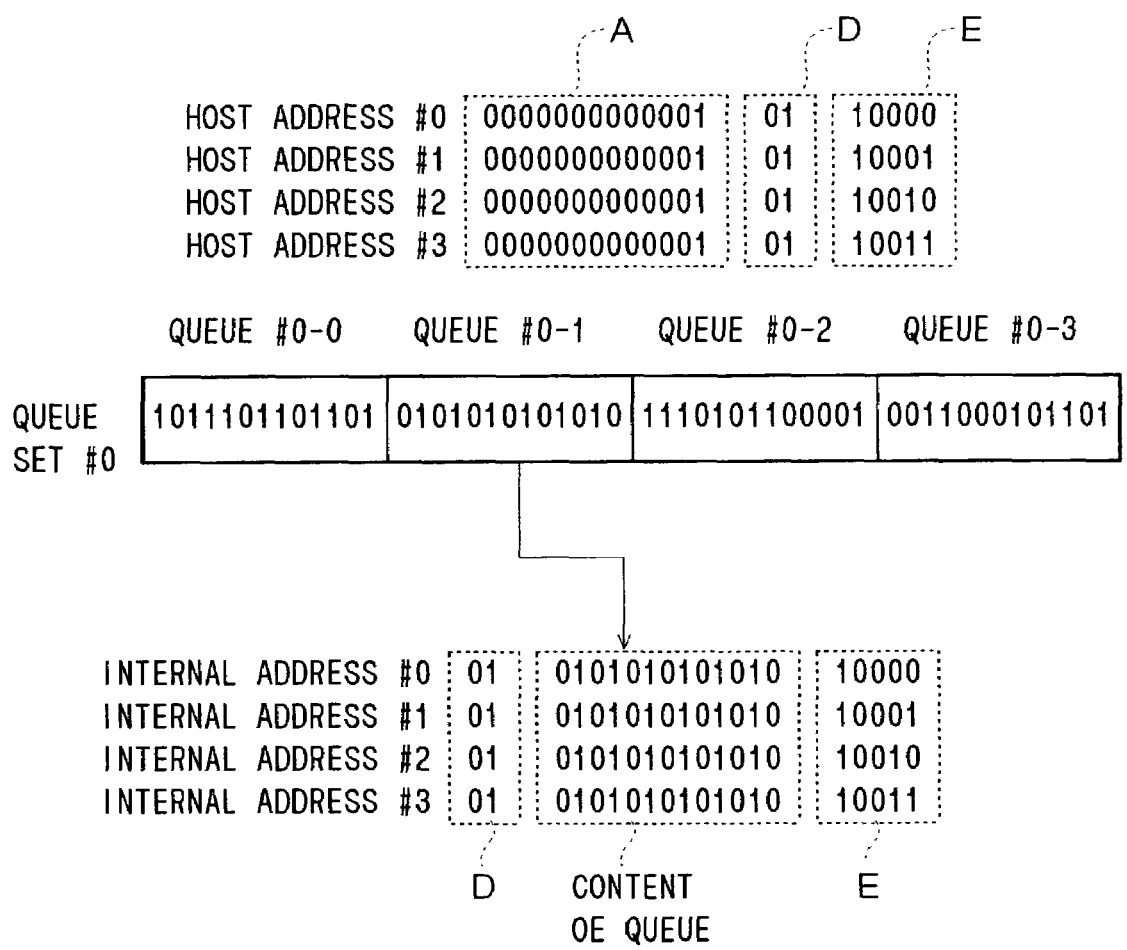
FIG. 14 is a schematic diagram showing the generation method to obtain an internal address using the write queue 32 during the data write operation #2.

FIG. 14 is a schematic diagram showing the generation method to obtain an internal address using the write queue 32 during the data write operation #2.

As shown in FIG. 14, in the exemplified case, because the upper 13 bits (A) of the host addresses #0 to #3 are "0000000000001B (1)" and the 2 bits (D) of the upper 14th bit and the upper 15th bit of the host addresses are "01B (1)", the cell #1-1 and the flag #1-1 included in the virtual block indicating area #1 are selected. In this time, the virtual block to be accessed is detected as the vertical writing virtual block.

When the virtual block to be accessed is detected as the vertical writing virtual block, the contents of the cell #1-1 and the flag #1-1 of the address translation table 31 stored in the SRAM work area 8 are read out under the control of the microprocessor 6. Because the data write operation #2 is the new data writing operation, i.e., is the operation to assign new data to the host address corresponding to the virtual block in which no data are stored, the content of the flag #1-1 should be "0 (invalid)".

Next, one of the queues #0-1 to #5-1 constituting the write queue 32, the queue #0-1 for example, is selected based on the 2 bits (D) of the upper 14th bit and the upper 15th bit of the host addresses, "01B (1)" and the content stored therein is read out under the control of the microprocessor 6. As shown in FIG. 14, assume that the contents of the queue #0-1 is "0101010101010B (2730)".

When the content of the queue #0-1 is read out, the content is stored in the cell #1-1 included in the virtual block indicating area #1 and corresponding flag #1-1 is changed from "0 (invalid)" to "1 (valid)". Therefore, the generation of the partial virtual block is completed.

Then as shown in FIG. 14, the 2 bits (D) of the upper 14th bit and upper 15th bit of the host addresses #0 to #3, the content read from the queue, and the lower 5 bits (A) of the host addresses #0 to #3 are combined in this order under the control of the microprocessor 6. The combined addresses are the internal addresses #0 to #3, respectively. In the exemplified case, because the every 2 bits (D) of the upper 14th bit and upper 15th bit of the host addresses #0 to #3 are "01B", the content read from the queue is "0101010101010B", and the lower 5 bits (A) of the host addresses #0 to #3 are "10000B" to "10011B", respectively, the values of the four internal addresses #0 to #3 become the values shown in FIG. 14.

Then, the address translation from the host addresses #0 to #3 to the internal addresses #0 to #3 is completed. As explained earlier, the upper 2 bits of the internal address indicate the flash memory chip number to be accessed, the 13 bits composed of the upper 3rd bit to the upper 15th bit of the internal address indicate the physical block address to be accessed, and the lower 5 bits of the internal address indicate the physical page address to be accessed. Therefore, the physical page designated by the internal address #0 is the physical page #16 of the physical block #2730 which belongs to the flash memory chip 2-1; the physical page designated by the internal address #1 is the physical page #17 of the same physical block; the physical page designated by the internal address #2 is the physical page #18 of the same physical block; and the physical page designated by the internal address #3 is the physical page #19 of the same physical block.

In accordance with the external write command is stored in the task file registers (not shown) included in the host interface block 7, the registers (not shown) included in the flash sequencer block 12 are set under the control of the microprocessor 6. This operation is performed as follows:

First, the internal write command which is a kind of internal command, is set in the predetermined registers (not shown) included in the flash sequencer block 12 under the control of the microprocessor 6. Further, the internal addresses #0 to #3 are set in other registers (not shown) included in the flash sequencer block 12 under the control of the microprocessor 6.

When the above setting for the registers included in the flash sequencer block 12 is completed, the sequential data write operations are started by the flash sequencer block 12. In the sequential data write operations, writing of the various redundant data to the virtual pages #1 of the virtual block #1 and writing the user data and various redundant data to the virtual pages #65, #69, #73 and #77 of the virtual block #1 are performed in this order. Every virtual pages #1, #65, #69, #73, and #77 of the virtual block #1 belong to the flash memory chip 2-1 and each of the virtual pages corresponds to the physical pages #0, #16, #17, #18, and #19 of the same physical block.

Figure 15:
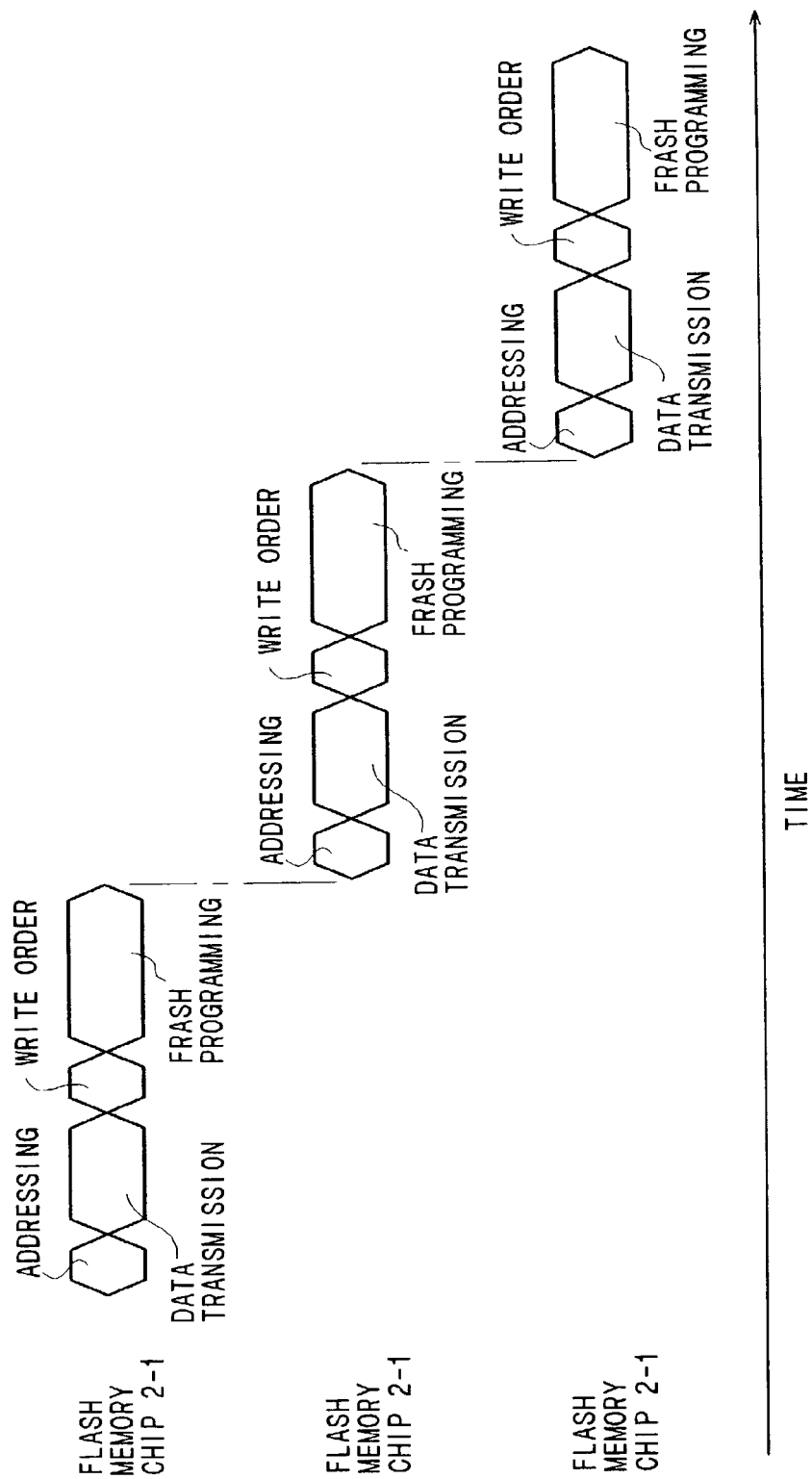
FIG. 15 is a timing chart showing a series of data write operations by a flash sequencer block 12 during the data write operation #2.

FIG. 15 is a timing chart showing the sequential data write operations for the virtual pages #1, #65, #69, #73, and #77 of the virtual block #1.

At first, the flash sequencer block 12 generates the internal address #5 which corresponds to the virtual page #1 of the virtual block #1. The internal address #5 which corresponds to the virtual page #1 of the virtual block #1 also corresponds to the physical page #0 of the physical block #2730 included in the flash memory chip 2-1 and its value is "0101010101011000000B".

Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the internal address #5. In the exemplified case, because the upper 2 bits of the internal address #5 are "01B (1)", the chip selection signal #1 is activated. Therefore, access of the flash memory chip 2-1 is enabled. The other chip selection signals #0, #2, and #3 are kept in the inactive state.

Next, the flash sequencer block 12 directs the flash memory interface block 10 to send the lower 18 bits of the internal address #5, which is "010101010101000000B", and the internal write command stored in the prescribed registers (not shown) to the bus 15. Although the lower 18 bits of the internal address #5 and the internal write command are provided in common for the flash memory chips 2-0 to 2-3 via the bus 15, they are only valid for the flash memory chip 2-1 because the chip selection signal #1 is in the active state while the other the chip selection signals #0, #2, and #3 are in the inactive state (addressing).

As a result, the flash memory chip 2-1 is enabled to write data into the physical page designated by the lower 18 bits of the internal address #5, "010101010101000000B".

Next, the data to be written to the virtual page #1 of the virtual block #1 is supplied to the bus 15 via the flash memory interface block 10 under the control of the flash sequencer block 12. The virtual page #1 of the virtual block #1 corresponds to the physical page #0 of the physical block #2730 included in the flash memory chip 2-1; and the data to be written thereto are composed of the virtual block address and other additional information each of which is the data to be stored in the redundant area 26. The value of the virtual block address to be stored in the redundant area 26 is "0000000000001B (1)". No data are stored in the other areas, the user area 25 and the error correction code storing area 27 of the redundant area 26, of the physical page #0 of the physical block #2730 included in the flash memory chip 2-1.

Although the virtual block address and other data to be stored in the redundant area 26 are also supplied in common to the flash memory chips 2-0 to 2-3 via bus 15, they are only valid for the flash memory chip 2-1 because only the chip selection signal #1 is in the active state (data transmission).

After the virtual block address and so forth are transferred to the flash memory chip 2-1 which is enabled to write data, the transferred data are temporarily stored in the register (not shown) employed in the flash memory chip 2-1.

Next, the flash sequencer block 12 issues the internal write command stored in the prescribed register to the flash memory chip 2-1 (write order).

In response to the write order, the flash memory chip 2-1 stores the data temporarily stored in the register to the address designated by the addressing operation (flash programming). Therefore, the data temporarily stored in the register is written in the page designated by the lower 18 bits of the internal address #5, "010101010101000000B", which is the physical page #0 of the physical block #2730 included in the flash memory chip 2-1.

During the flash programming, the flash memory chip 2-1 is in the busy state so that another write operation cannot be performed.

In the meantime the flash programming is completed and the busy state is cancelled, the data write operations for writing the user data and the various redundant data to the virtual pages #65, #69, #73, and #77 of the virtual block #1 are performed. These data write operations is the same as the data write operation for the virtual page #1 of the virtual block #1 other than the data to be written includes the corresponding user data and the error correction codes.

These data write operations are sequentially performed each time when the busy state of the flash memory chip 2-1 is cancelled.

In response to the fact that the physical block address stored in the queue #0-1 of the write queue 32 have been changed from the physical block address of the free block to the physical block address of the used block, the microprocessor 6 selects other physical block among the redundant blocks and stores its physical block address to the queue #0-1.

Then, the sequential write operation by the flash sequencer block 12 is completed.

As mentioned above, according to the data write operation #2, the user data which correspond to the successive host addresses #0 to #3 have been written in the same physical block different from the data write operation #1.

In the exemplified case, although the virtual block address is written in not only the top page (physical page #0) in the physical block but also other physical pages (physical pages #16 to #19), the virtual block address can be omitted to write in the other physical pages.

Data Write Operation #3 (in case of data overwriting (host address corresponds to the lateral writing virtual block))

In case of data overwriting, "the inter-block data transferring" will be performed. The necessity of the inter-block data transferring will be explained as follows:

As explained earlier, each flash memory cell 16 included in the flash memory chips 2-0 to 2-3 can be changed from the erased state to the programmed state as an individual unit but cannot be changed from the programmed state to the erased state as an individual unit. In order to change the programmed state to the erased state, it is required to perform a block erasing operation to change the states of all flash memory cells 16 included in the block to the erased state. For this reason, in order to write user data to certain physical page, all flash memory cells 16 constitute the user area 25 of the physical page should be in the erased state. In other words, the different user data cannot be directly overwritten in the physical page in which the certain user data are already stored, i.e., at least one of the flash memory cells 16 constituting the user area 25 of the physical page is in the programmed state. Therefore, in order to write new data in the physical page in which the certain user data are already stored, first, the physical block including this physical page should be block-erased to change the states of all flash memory cells 16 included therein to the erased state, and whereafter the new data should be written in this physical page.

Therefore, in the case where the old data stored in the certain physical page are overwritten by the new data, the user data stored in the other physical pages should be transferred to the physical pages of another physical block so as to prevent the data from being broken.

Such an operation performed with the data overwriting is called "the inter-block data transferring". The physical block address of the source physical block is called "source block address" and the physical block address of the destination physical block is called "destination block address".

The data overwrite operation in the case where the virtual block to be accessed is the lateral writing virtual block will be explained.

The data write operation #3 will be explained for the case where the external write command the successive host addresses "0001010101010100000B" to "0001010101010101000011B", and user data to be written are supplied to the flash memory system 1 via the bus 14, the connector 4, and the bus 13 from the host computer 5 immediately after the data write operation #1 has been completed. Hereinafter, these successive host addresses are also referred to as the host addresses #0 to #3. These host addresses #0 to #3 correspond to the virtual pages #64 to #67 of the virtual block #682, respectively.

First, when the host addresses #0 to #3 and the external write command are supplied to the controller 3, the host addresses #0 to #3 and the external write command are temporarily stored in the task file register (not shown) of the host interface block 7. Further, when the user data to be written are supplied to the controller 3, they are transferred to the ECC block 11 under the control of the microprocessor 6. In response to receipt of the user data, the ECC block 11 analyzes the user data to generate the error correction code and the ECC block 11 temporarily stores it. On the other hand, the user data are stored in the buffer 9.

Next, the generation of the source block address and the destination block address using the address translation table 31 and the write queue 32 is performed.

Figure 16:
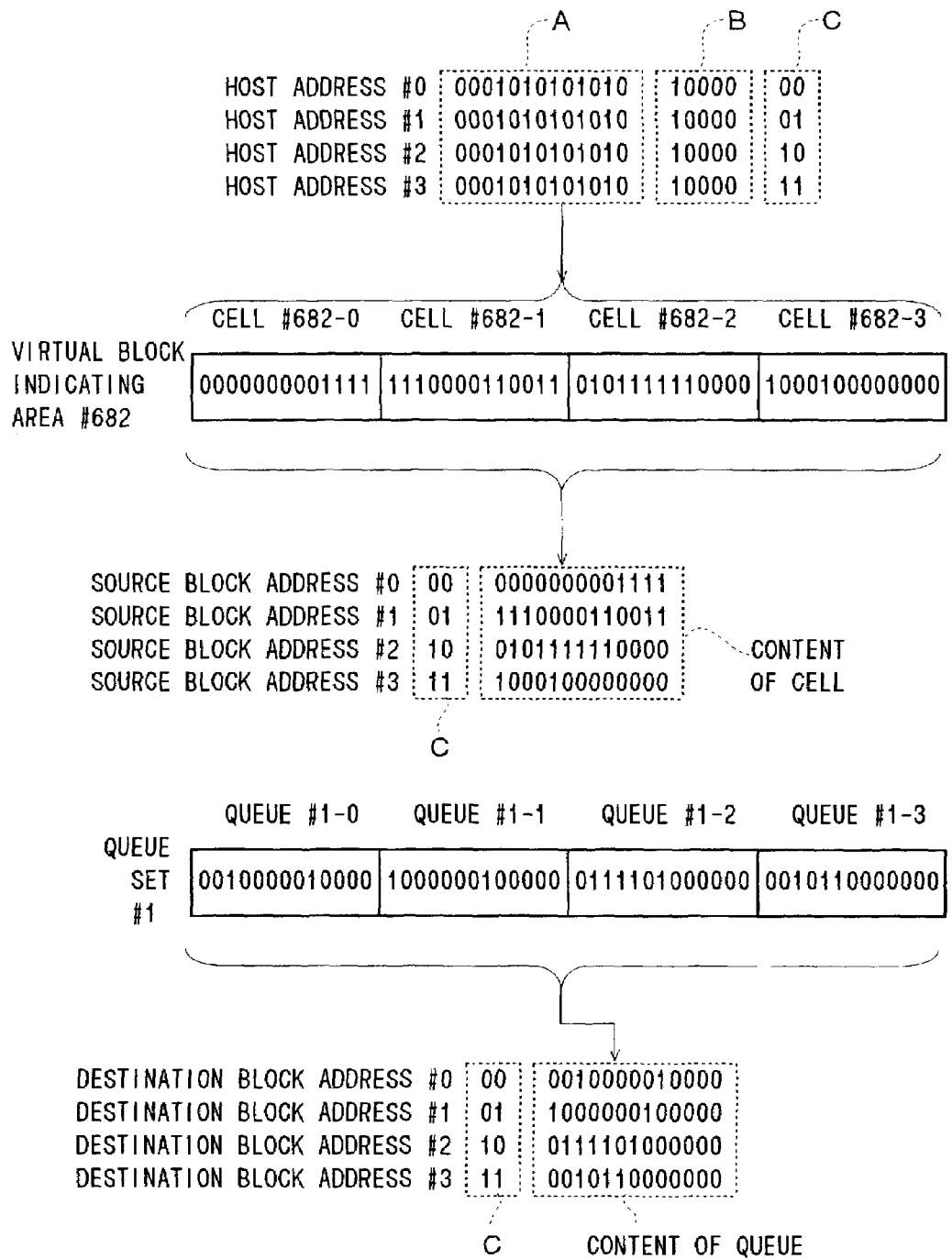
FIG. 16 is a schematic diagram showing the generation method to obtain a source block address and a destination block address using the address translation table 31 and the write queue 32 during the data write operation #3.

FIG. 16 is a schematic diagram showing the generation method to obtain the source block address and the destination block address.

As shown in FIG. 16, in the exemplified case, because the upper 13 bits (A) of the host addresses #0 to #3 are "0001010101010B (682)", the virtual block indicating area #682 is selected. In this time, the virtual block to be accessed is detected as the lateral writing virtual block.

When the virtual block to be accessed is detected as the lateral writing virtual block, the contents of the virtual block indicating area #682 of the address translation table 31 stored in the SRAM work area 8 are read out under the control of the microprocessor 6. In this case, because the user data are already stored in the virtual block #682 by the data write operation #1, every contents of the flags #682-0 to #682-3 should be "1 (valid)". Further, the contents of the cells #682-0 to #682-3 are "0000000001111B (15)", "1110000110011B (7219)", "0101111111000B (3056)", and "1000100000000B (4352)", respectively.

When the contents of the cells #682-0 to #682-3 are read out, the source block addresses are generated under the control of the microprocessor 6.

The source block addresses are generated by such a manner that the lower 2 bits (C) of the host addresses #0 to #3 and the contents read from the corresponding cells are combined in this order under the control of the microprocessor 6. In the exemplified case, because the lower 2 bits (C) of the host addresses #0 to #3 are "00B" to "11B", respectively, and the contents read from the cells are "0000000001111B", "1110000110011B", "0101111110000B", and "1000100000000B", respectively, the values of the four source block addresses #0 to #3 become the values shown in FIG. 16.

This completes the generation of the source block addresses #0 to #3.

Next, one of the queue sets #0 to #5 constituting the write queue 32, the queue set #1 for example, is selected and the contents stored in the each queue #1-0 to #1-3 constituting the selected queue set #1 are read out under the control of the microprocessor 6. As mentioned above, the contents of the each queue are the physical block addresses of the free blocks. As shown in FIG. 16, assume that the contents of the queues #1-0 to #1-3 are "0010000010000B (1040)", "1000000100000B (4128)", "0111101000000B (3904)", and "0010110000000B (1408)".

When the contents of the queues #1-0 to #1-3 are read out, they are overwritten in the cells #682-0 to #682-3 included in the virtual block indicating area #682, respectively and the destination block addresses are generated under the control of the microprocessor 6.

The destination block addresses are generated by such a manner that the lower 2 bits (C) of the host addresses #0 to #3 and the contents read from the corresponding queues are combined in this order under the control of the microprocessor 6. In the exemplified case, because the lower 2 bits (C) of the host addresses #0 to #3 are "00B" to "11B", respectively, and the contents read from the queues are "0010000010000B", "1000000100000B", "0111101000000B", and "0010110000000B", respectively, the values of the four destination block addresses #0 to #3 become the values shown in FIG. 16.

This completes the generation of the destination block addresses #0 to #3.

When above mentioned operations are completed, the registers (not shown) included in the flash sequencer block 12 are set under the control of the microprocessor 6. This operation is performed as follows:

First, the internal write command and the internal read command are set in the predetermined registers (not shown) included in the flash sequencer block 12 under the control of the microprocessor 6. Further, the source block addresses #0 to #3 and the destination block addresses #0 to #3 are set in other registers (not shown) included in the flash sequencer block 12 under the control of the microprocessor 6.

When the above setting for the registers included in the flash sequencer block 12 is completed, the sequential data transferring operations are started by the flash sequencer block 12. Details of the sequential data transferring operations will be explained as follows:

First, the flash sequencer block 12 generates the internal source address of 20 bits by adding "00000B (0)" to the source block address #0 stored in the prescribed register. In this case the internal source address becomes "00000000000111100000B". Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the generated internal source address. In the exemplified case, because the upper 2 bits of the internal source address are "00B (0)", the chip selection signal #0 is activated. Therefore, access of the flash memory chip 2-0 is enabled The other chip selection signals #1 to #3 are kept in the inactive state.

Next, the flash sequencer block 12 directs the flash memory interface block 10 to send the lower 18 bits of the internal source address, which is "000000000111100000B", and the internal read command stored in the prescribed registers (not shown) to the bus 15.

As a result, the flash memory chip 2-0 can read data stored at the lower 18 bits of the internal source address "000000000111100000B". That is, the flash memory chip 2-0 reads data stored at the physical page #0 of the physical block #15. The physical page #0 of the physical block #15 included in the flash memory chip 2-0 corresponds to the virtual page #0 of the virtual block #682.

The user data and additional information read from the flash memory chip 2-0 are supplied to the flash memory interface block 10 via the bus 15. When the flash memory interface block 10 receives the user data, the user data are temporarily stored in the buffer 9 and they are supplied to the ECC block 11 to generate a new error correction code. The new error correction code are temporarily stored in the ECC block 11.

Such a data read operation is also performed by adding "00000B (0)" to the source block addresses #1 to #3 so as to read data from the flash memory chips 2-1 to 2-3. As a result, data stored in the physical page #0 of the physical block #7219 included in the flash memory chip 2-1, the physical page #0 of the physical block #3056 included in the flash memory chip 2-2, and the physical page #0 of the physical block #4352 included in the flash memory chip 2-3 are also read out. The physical page #0 of the physical block #7219 included in the flash memory chip 2-1 corresponds to the virtual page #1 of the virtual block #682; the physical page #0 of the physical block #3056 included in the flash memory chip 2-2 corresponds to the virtual page #2 of the virtual block #682; and the physical page #0 of the physical block #4352 included in the flash memory chip 2-2 corresponds to the virtual page #3 of the virtual block #682. That is, this completes the data reading from the virtual pages #0 to #3 of the virtual block #682.

Next, the data write operations to store the user data stored in the buffer 9 and the error correction codes stored in the ECC block 11 are performed. These data write operations are performed according to the timing chart shown in FIG. 13.

First, the flash sequencer block 12 generates the internal destination address of 20 bits by adding "00000B (0)" to the destination block address #0 stored in the prescribed register. In this case the internal destination address becomes "00001000001000000000B".

Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the generated internal destination address. In the exemplified case, because the upper 2 bits of the internal destination address are "00B (0)", the chip selection signal #0 is activated. Therefore, access of the flash memory chip 2-0 is enabled.

Next, the flash sequencer block 12 directs the flash memory interface block 10 to send the lower 18 bits of the internal destination address and the internal write command stored in the prescribed registers (not shown) to the bus 15. Although the lower 18 bits of the internal destination address and the internal write command are provided in common for the flash memory chips 2-0 to 2-3 via the bus 15, they are only valid for the flash memory chip 2-0 because the chip selection signal #0 is in the active state while the other the chip selection signals #1 to #3 are in the inactive state (addressing).

Next, the user data read from the flash memory chip 2-0 among the user data stored in the buffer 9 and the additional information to be stored in the redundant area 26 including the corresponding error correction code stored in the ECC block 11 and the virtual block address, which is #682, are supplied to the bus 15 via the flash memory interface block 10 under the control of the flash sequencer block 12. Although the user data and the additional information are also supplied in common to the flash memory chips 2-0 to 2-3 via bus 15, they are only valid for the flash memory chip 2-0 because only the chip selection signal #0 is in the active state (data transmission). The transferred user data and the additional information are temporarily stored in the register (not shown) employed in the flash memory chip 2-0.

Next, the flash sequencer block 12 issues the internal write command stored in the prescribed register to the flash memory chip 2-0 (write order).

In response to the write order, the flash memory chip 2-0 stores the user data and the additional information temporarily stored in the register to the address designated by the addressing operation (flash programming). Therefore, the data temporarily stored in the register are written in the page designated by the lower 18 bits of the internal destination address, "001000001000000000B", which is the physical page #0 of the physical block #1040 included in the flash memory chip 2-0. The physical page #0 of the physical block #1040 included in the flash memory chip 2-0 corresponds to the virtual page #0 of the virtual block #682.

While the flash programming is performed by the flash memory chip 2-0, the flash sequencer block 12 generates a new internal destination address by adding "00000B (0)" to the destination block address #1 stored in the prescribed register. In this case the new internal destination address becomes "011000000100000000B". Next, the flash sequencer block 12 directs the flash memory interface block 10 to activate the chip selection signal #1 based on the upper 2 bits of the new internal destination address. Therefore, access of the flash memory chip 2-1 is enabled.

Next, the flash sequencer block 12 directs the flash memory interface block 10 to send the lower 18 bits of the internal destination address and the internal write command stored in the prescribed registers (not shown) to the bus 15. They are only valid for the flash memory chip 2-1 because the chip selection signal #1 is in the active state while the other the chip selection signals #0, #2, and #3 are in the inactive state (addressing).

Next, the user data read from the flash memory chip 2-1 among the user data stored in the buffer 9 and the additional information to be stored in the redundant area 26 including the corresponding error correction code stored in the ECC block 11 and the virtual block address, which is #682, are supplied to the bus 15 via the flash memory interface block 10 under the control of the flash sequencer block 12 (data transmission). Then, the flash sequencer block 12 issues the internal write command to the flash memory chip 2-1 (write order). In response to the write order, the flash memory chip 2-1 performs flash programming so as to store the user data and the additional information temporarily stored in the register to the page designated by the lower 18 bits of the internal destination address, "100000010000000000B", which is the physical page #0 of the physical block #4128 included in the flash memory chip 2-1. The physical page #0 of the physical block #4128 included in the flash memory chip 2-1 corresponds to the virtual page #1 of the virtual block #682.

Such data write operations are also performed by adding "00000B (0)" to the destination block addresses #2 and #3 so as to write data to the flash memory chips 2-2 and 2-3. As a result, the user data read from the flash memory chip 2-2 and the additional information are written in the physical page #0 of the physical block #3904 included in the flash memory chip 2-2; and user data read from the flash memory chip 2-3 and the additional information are written in the physical page #0 of the physical block #1408 included in the flash memory chip 2-3. The physical page #0 of the physical block #3904 included in the flash memory chip 2-2 corresponds to the virtual page #2 of the virtual block #682; and the physical page #0 of the physical block #1408 included in the flash memory chip 2-2 corresponds to the virtual page #3 of the virtual block #682.

Then, the data each of which is stored in the virtual pages #0 to #3 of the source virtual block are written in the virtual pages #0 to #3 of the destination virtual block, respectively. That is, this completes the data transferring from the virtual pages #0 to #3 of the source virtual block to the virtual pages #0 to #3 of the destination virtual block.

Such data transferring operations are successively performed by incrementing the 5 bits to be added to the source block addresses and the destination block addresses. Specifically, when the 5 bits to be added to the source block addresses and the destination block addresses are "00001B (1)", the data transferring operations are performed from the virtual pages #4 to #7 of the source virtual block to the virtual pages #4 to #7 of the destination virtual block; and when the 5 bits to be added to the source block addresses and the destination block addresses are "00010B (2)", the data transferring operations are performed from the virtual pages #8 to #11 of the source virtual block to the virtual pages #8 to #11 of the destination virtual block.

The data transferring operations are successively performed until the 5 bits to be added are coincident with the 5 bits (B) composed of the upper 14th bit to the upper 18th bit of the host addresses #0 to #3, which is "10000B (16)". Specifically, when the 5 bits to be added become "10000B (16)" which are coincident with the 5 bits (B) composed of the upper 14th bit to the upper 18th bit of the host addresses #0 to #3 caused by the 5 bits to be added are incremented, the data transferring operations are temporarily suspended. In the exemplified case, the 5 bits to be added are coincident with the 5 bits (B) composed of the upper 14th bit to the upper 18th bit of the host addresses #0 to #3 at the time when the data transferring operations from the virtual pages #0 to #63 of the source virtual block to the virtual pages #0 to #63 of the destination virtual block are completed.

When the 5 bits to be added are coincident with the 5 bits (B) composed of the upper 14th bit to the upper 18th bit of the host addresses #0 to #3, the flash sequencer block 12 generates new internal destination addresses by adding "10000B (16)" to the destination block addresses #0 to #3 without generating the internal source addresses corresponding to the 5 bits "10000B (16)" to be added. For example, the value of the internal destination address generated by adding "10000B (16)" to the destination block address #0 is "000010000010000010000B".

Next, the flash sequencer block 12 directs the flash memory interface block 10 to activate the chip selection signal #0 based on the upper 2 bits of the internal destination address and to send the lower 18 bits of the internal destination address and the internal write command stored in the prescribed registers (not shown) to the bus 15 (addressing).

Next, the user data corresponding to the host address #0 stored in the buffer 9 and the additional information to be stored in the redundant area 26 including the corresponding error correction code stored in the ECC block 11 are supplied to the bus 15 via the flash memory interface block 10 under the control of the flash sequencer block 12 (data transmission). The transferred user data and the additional information are temporarily stored in the register (not shown) employed in the flash memory chip 2-0.

Then, the flash sequencer block 12 issues the internal write command stored in the prescribed register to the flash memory chip 2-0 (write order). In response to the write order, the flash memory chip 2-0 stores the user data and the additional information temporarily stored in the register to the address designated by the addressing operation (flash programming).

While the flash programming is performed by the flash memory chip 2-0, the flash sequencer block 12 generates a new internal destination address by adding "10000B (16)" to the destination block address #1 and performs the addressing, data transmission and write order so as to write the user data and the additional information to the flash memory chip 2-1. Such parallel operations are already explained that the addressing, data transmission and write order are performed for one of the flash memory chips while another flash memory chip is performing the flash programming. Therefore, the user data corresponding to the host address #0 are written in the physical page #16 of the physical block #1040 included in the flash memory chip 2-0; the user data corresponding to the host address #1 are written in the physical page #16 of the physical block #4128 included in the flash memory chip 2-1; the user data corresponding to the host address #2 are written in the physical page #16 of the physical block #3904 included in the flash memory chip 2-2; and the user data corresponding to the host address #3 are written in the physical page #16 of the physical block #1408 included in the flash memory chip 2-3.

That is, the user data corresponding to the host addresses #0 to #3 have been stored in the virtual pages #64 to #67 of the destination virtual block, respectively.

When the data write operations concerning the host addresses #0 to #3 are completed, the data transferring operations using the internal source addresses and the internal destination addresses are restarted by incrementing the 5 bits to be added to the source block addresses #0 to #3 and the destination block addresses #0 to #3. The data transferring operations are successively performed until the data transferring operations using the internal source addresses and the internal destination addresses which are generated by adding "11111B (31)" are completed. Specifically, the data transferring operations are successively performed until the data transferring operations from the virtual pages #68 to #127 of the source virtual block to the virtual pages #68 to #127 of the destination virtual block are completed. Then, the sequential data transferring operations by the flash sequencer block 12 are completed.

In response to the fact that the physical block addresses stored in the queue set #1 of the write queue 32 have been changed from the physical block addresses of the free blocks to the physical block addresses of the used blocks, the microprocessor 6 selects other physical blocks among the redundant blocks and stores their physical block addresses to the queues #1-0 to #1-3.

Further, every physical blocks constituting the source virtual block are block-erased so as to be the free blocks. The block erasing can be also performed in parallel because they belong to the different flash memory chips one another.

Thus, the inter-block data transferring are completed.

As described above, in case of data overwriting for the lateral writing virtual block, although the inter-block data transferring should be performed between four pairs of physical blocks, the inter-block data transferring can be performed in fast because they are performed in parallel.

Data Write Operation #4 (in case of data overwriting (host address corresponds to the vertical writing virtual block))

As explained earlier, the vertical writing virtual block corresponds to an area including a part in which a top of the host address is assigned, a FAT (file allocation table) and so forth are stored in the area in general. For this reason, data writing to small sectors (pages) in unit in the vertical writing virtual blocks are frequently performed compared with the lateral writing virtual blocks. In view of foregoing, in case of data overwriting for the vertical writing virtual block, the inter-block data transferring are performed between one pair of physical blocks so as to fasten the data overwriting.

The data write operation #4 will be explained for the case where the external write command the successive host addresses "00000000000010101000B" to "00000000000010101011B", and user data to be written are supplied to the flash memory system 1 via the bus 14, the connector 4, and the bus 13 from the host computer 5 immediately after the data write operation #2 has been completed. Hereinafter, these successive host addresses are also referred to as the host addresses #0 to #3. These host addresses #0 to #3 correspond to the virtual pages #33, #37, #41, and #45 of the virtual block #1, respectively.

First, when the host addresses #0 to #3 and the external write command are supplied to the controller 3, the host addresses #0 to #3 and the external write command are temporarily stored in the task file register (not shown) of the host interface block 7. Further, when the user data to be written are supplied to the controller 3, they are transferred to the ECC block 11 under the control of the microprocessor 6. In response to receipt of the user data, the ECC block 11 analyzes the user data to generate the error correction code and the ECC block 11 temporarily stores it. On the other hand, the user data are stored in the buffer 9.

Next, the generation of the source block address and the destination block address using the address translation table 31 and the write queue 32 is performed.

FIG. 17 is a schematic diagram showing the generation method to obtain the source block address and the destination block address.

As shown in FIG. 17, in the exemplified case, because the upper 13 bits (A) of the host addresses #0 to #3 are "0000000000001B (1)" and the 2 bits (D) of the upper 14th bit and the upper 15th bit of the host addresses #0 to #3 are "01B (1)", the cell #1-1 and the flag #1-1 included in the virtual block indicating area #1 are selected. In this time, the virtual block to be accessed is detected as the vertical writing virtual block.

When the virtual block to be accessed is detected as the vertical writing virtual block, the contents of the cell #1-1 and the flag #1-1 of the address translation table 31 stored in the SRAM work area 8 are read out under the control of the microprocessor 6. In this case, because the user data are already stored in the physical block corresponding to the cell #1-1 by the data write operation #2, the content of the flag #1-1 should be "1 (valid)". Further, the content of the cell #1-1 is "0101010101010B (2730)". On the other hand, the contents of the flags #1-0, #1-2, and #1-3 should be "0 (invalid)" because no physical blocks are assigned for the cells #1-0, #1-2, and #1-3. That is, the contents of the cells #1-0, #1-2, and #1-3 are invalid.

When the contents of the cell #1-1 is read out, the source block address is generated under the control of the microprocessor 6.

The source block address is generated by such a manner that the 2 bits (D) of the upper 14th bit and the upper 15th bit of the host addresses #0 to #3 and the content read from the cell #1-1 are combined in this order under the control of the microprocessor 6. In the exemplified case, because the 2 bits (D) of the upper 14th bit and the upper 15th bit of the host addresses #0 to #3 is "01B" and the content read from the cell #1-1 is "0101010101010B", the value of the source block address becomes the value shown in FIG. 17.

This completes the generation of the source block address.

Next, one of the queue sets #0 to #5 constituting the write queue 32, the queue set #1 for example, is selected and the content stored in the queue #1-1 including the selected queue set #1 are read out based on the 2 bits (D) of the upper 14th bit and the upper 15th bit of the host addresses #0 to #3 under the control of the microprocessor 6. As shown in FIG. 17, assume that the content of the queue #1-1 is "1011100110011B (5939)".

When the content of the queue #1-1 is read out, it is overwritten in the cell #1-1 included in the virtual block indicating area #1 and the destination block address is generated under the control of the microprocessor 6.

The destination block addresses are generated by such a manner that the 2 bits (D) of the upper 14th bit and upper 15th bit of the host addresses #0 to #3 and the content read from the queue are combined in this order under the control of the microprocessor 6. In the exemplified case, because the 2 bits (D) of the upper 14th bit and upper 15th bit of the host addresses #0 to #3 are "01B" and the content read from the queue is "1011100110011B", the values of the destination block address becomes the value shown in FIG. 17.

This completes the generation of the destination block address.

When above mentioned operations are completed, the registers (not shown) included in the flash sequencer block 12 are set under the control of the microprocessor 6. This operation is performed as follows:

First, the internal write command and the internal read command are set in the predetermined registers (not shown) included in the flash sequencer block 12 under the control of the microprocessor 6. Further, the source block address and the destination block address are set in other registers (not shown) included in the flash sequencer block 12 under the control of the microprocessor 6.

When the above setting for the registers included in the flash sequencer block 12 is completed, the sequential data transferring operations are started by the flash sequencer block 12. Details of the sequential data transferring operations will be explained as follows:

First, the flash sequencer block 12 generates the internal source address of 20 bits by adding "00000B (0)" to the source block address stored in the prescribed register. In this case the internal source address becomes "01010101010101000000B". Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the generated internal source address. In the exemplified case, because the upper 2 bits of the internal source address are "01B (1)", the chip selection signal #1 is activated. Therefore, access of the flash memory chip 2-1 is enabled. The other chip selection signals #0, #2, and #3 are kept in the inactive state.

Next, the flash sequencer block 12 directs the flash memory interface block 10 to send the lower 18 bits of the internal source address, which is "010101010101000000B", and the internal read command stored in the prescribed registers (not shown) to the bus 15.

As a result, the flash memory chip 2-1 can read data stored at the lower 18 bits of the internal source address "010101010101000000B". That is, the flash memory chip 2-1 reads data stored at the physical page #0 of the physical block #2730. The physical page #0 of the physical block #2730 included in the flash memory chip 2-1 corresponds to the virtual page #1 of the virtual block #1.

The user data and additional information read from the flash memory chip 2-1 are supplied to the flash memory interface block 10 via the bus 15. When the flash memory interface block 10 receives the user data, the user data are temporarily stored in the buffer 9 and they are supplied to the ECC block 11 to generate a new error correction code. The new error correction code are temporarily stored in the ECC block 11.

Next, the data write operations to store the user data stored in the buffer 9 and the error correction codes stored in the ECC block 11 are performed.

First, the flash sequencer block 12 generates the internal destination address of 20 bits by adding "00000B (0)" to the destination block address stored in the prescribed register. In this case the internal destination address becomes "01101110011001100000B".

Next, the flash sequencer block 12 directs the flash memory interface block 10 to activate the one of the chip selection signals #0 to #3 corresponding to the flash memory chip to be accessed among the flash memory chips 2-0 to 2-3 based on the upper 2 bits of the generated internal destination address. In the exemplified case, because the upper 2 bits of the internal destination address are "01B (1)", the chip selection signal #1 is activated. Therefore, access of the flash memory chip 2-1 is enabled.

Next, the flash sequencer block 12 directs the flash memory interface block 10 to send the lower 18 bits of the internal destination address and the internal write command stored in the prescribed registers (not shown) to the bus 15. Although the lower 18 bits of the internal destination address and the internal write command are provided in common for the flash memory chips 2-0 to 2-3 via the bus 15, they are only valid for the flash memory chip 2-1 because the chip selection signal #1 is in the active state while the other the chip selection signals #0, #2, and #3 are in the inactive state (addressing).

Next, the user data read from the flash memory chip 2-1 stored in the buffer 9 and the additional information to be stored in the redundant area 26 including the corresponding error correction code stored in the ECC block 11 and the virtual block address, which is #1, are supplied to the bus 15 via the flash memory interface block 10 under the control of the flash sequencer block 12. Although the user data and the additional information are also supplied in common to the flash memory chips 2-0 to 2-3 via bus 15, they are only valid for the flash memory chip 2-1 because only the chip selection signal #1 is in the active state (data transmission). The transferred user data and the additional information are temporarily stored in the register (not shown) employed in the flash memory chip 2-1.

Next, the flash sequencer block 12 issues the internal write command stored in the prescribed register to the flash memory chip 2-1 (write order).

In response to the write order, the flash memory chip 2-1 stores the user data and the additional information temporarily stored in the register to the address designated by the addressing operation (flash programming). Therefore, the data temporarily stored in the register are written in the page designated by the lower 18 bits of the internal destination address, "1011100110011000000B", which is the physical page #0 of the physical block #5939 included in the flash memory chip 2-1. The physical page #0 of the physical block #5939 included in the flash memory chip 2-1 corresponds to the virtual page #1 of the virtual block #1.

During the flash programming, the flash memory chip 2-1 is in the busy state so that another operation cannot be performed. In the meantime the flash programming is completed and the busy state is cancelled, this means that the data transferring from the physical page #1 of the source virtual block to the physical page #1 of the destination virtual block is completed.

When the busy state is cancelled, the flash sequencer block 12 generates a new internal source address by adding "00001B (1)" to the source block address stored in the prescribed register so as to read data and generates a new internal destination address by adding "00001B (1)" to the destination block address stored in the prescribed register so as to write data. Then the data transferring from the virtual page #1 of the source virtual block to the virtual page #1 of the destination virtual block is performed by using the internal source address and the internal destination address.

Such data transferring operations are successively performed by incrementing the 5 bits to be added to the source block address and the destination block address until the 5 bits to be added are coincident with the lower 5 bits (E) of the host address #0, which is "01000B (8)". In the exemplified case, the 5 bits to be added are coincident with the lower 5 bits (E) of the host address #0 at the time when the data transferring operations from the physical pages #0 to #7 of the source physical block to the physical pages #0 to #7 of the destination physical block are completed.

When the 5 bits to be added are coincident with the lower 5 bits (E) of the host address #0, the flash sequencer block 12 generates a new internal destination address by adding "01000B (8)" to the destination block address without generating the internal source address corresponding to the 5 bits "010000B (8)" to be added. The value of the internal destination address generated by adding "010000B (8)" to the destination block address becomes "01101110011001101000B".

Next, the flash sequencer block 12 directs the flash memory interface block 10 to activate the chip selection signal #1 based on the upper 2 bits of the internal destination address and to send the lower 18 bits of the internal destination address and the internal write command stored in the prescribed registers (not shown) to the bus 15 (addressing).

Next, the user data corresponding to the host address #0 stored in the buffer 9 and the additional information to be stored in the redundant area 26 including the corresponding error correction code stored in the ECC block 11 are supplied to the bus 15 via the flash memory interface block 10 under the control of the flash sequencer block 12 (data transmission). The transferred user data and the additional information are temporarily stored in the register (not shown) employed in the flash memory chip 2-1.

Then, the flash sequencer block 12 issues the internal write command stored in the prescribed register to the flash memory chip 2-1 (write order). In response to the write order, the flash memory chip 2-1 stores the user data and the additional information temporarily stored in the register to the address designated by the addressing operation (flash programming).

When the flash programming concerning the user data corresponding to the host address #0 is completed, the flash sequencer block 12 generates a new internal destination address by adding "01001B (9)" to the destination block address. Then, the data write operation concerning the user data corresponding to the host address #1 and so forth is performed. Such data write operations are also performed for the user data corresponding to the host addresses #2 and #3 using new internal destination addresses by adding "01010B (10)" and "01011 (11)" to the destination block address.

That is, the user data corresponding to the host addresses #0 to #3 have been stored in the physical pages #8 to #11 of the destination physical block, respectively.

When the data write operations concerning the host addresses #0 to #3 are completed, the data transferring operations using the internal source addresses and the internal destination addresses are restarted by incrementing the 5 bits to be added to the source block address and the destination block address. The data transferring operations are successively performed until the data transferring operations using the internal source addresses and the internal destination addresses which are generated by adding "11111B (31)" are completed. Specifically, the data transferring operations are successively performed until the data transferring operations from the physical pages #12 to #31 of the source physical block to the physical pages #12 to #31 of the destination physical block are completed. Then, the sequential data transferring operations by the flash sequencer block 12 are completed.

In response to the fact that the physical block address stored in the queue #1-1 of the write queue 32 has been changed from the physical block address of the free block to the physical block address of the used block, the microprocessor 6 selects other physical block among the redundant block and stores its physical block address to the queue #1-1.

Further, the source physical block is block-erased so as to be the free block.

Thus, the inter-block data transferring are completed.

As described above, in case of data overwriting for the vertical writing virtual block, the inter-block data transferring can be performed in fast compared with the case of data overwriting for the lateral writing virtual block (data write operation #3) because the inter-block data transferring can be performed between only one pair of physical blocks.

According to the flash memory system 1 of this embodiment, because a plurality of physical block each of which belongs to different flash memory chip one another are treated as a single block, i.e., a virtual block, in the case where the data write request for writing data to successive addresses is issued from the host computer 5, the addressing, data transmission and so forth can be performed concerning the next data to be written during the flash programming, i.e., the parallel operations can be performed. Therefore, a series of data write operations can be performed in fast. Specifically, among a series of data write operations, the flash programming period is particularly long time, typically about 200 μsec. According to the flash memory system 1 of this embodiment, however, a time period required to complete a series of data write operations is shortened because the other operations can be performed during the flash programming in parallel.

Further, in the flash memory system 1 of this embodiment, the virtual blocks are divided into the lateral writing virtual blocks and the vertical writing virtual blocks, in the lateral writing virtual blocks the successive host addresses are assigned to successive virtual pages, in the lateral writing virtual blocks the successive host addresses are assigned to successive physical pages. For this reason, in case of data overwriting for the vertical writing virtual block, the inter-block data transferring can be performed in fast because the inter-block data transferring can be performed between only one pair of physical blocks. Therefore, if the vertical writing virtual blocks are assigned to the area in which the data overwrite requests to small sectors (pages) in unit are frequently issued, such as a FAT (file allocation table), the data overwrite requests can be finished in fast.

The present invention has thus been shown and described with reference to specific embodiments. However, it should be noted that the present invention is in no way limited to the details of the described arrangements but changes and modifications may be made without departing from the scope of the appended claims.

For example, in the flash memory system 1 of this embodiment, each virtual block is formed by virtually combined four physical blocks each of which belongs to the different flash memory chip one another. However, the number of physical blocks constituting one virtual block is not limited to four but other number, two or eight for example, can be allowed. It is worth noting that it is not essential to match the number of physical blocks constituting one virtual block with the number of flash memory chips employed in the flash memory system. Therefore, the number of physical blocks constituting one virtual block can be smaller than the number of flash memory chips employed in the flash memory system. For example, in the case where eight flash memory chips are employed in the flash memory system, one virtual block can be constituted of four physical blocks.

Further, in the flash memory system 1 of this embodiment, each virtual block is formed by virtually combined four physical blocks each of which belongs to the different flash memory chip one another. However, in the case where a flash memory chip of "bank type", in which the physical blocks included therein are divided into a plurality of banks each having a independent register and the data can be written in a plurality of physical blocks belonging to the different banks one another in parallel, is used, the virtual blocks can be formed by virtually combined a plurality of physical blocks each of which belongs to the different bank in the same flash memory chip one another.

In case of using a plurality of flash memory chips of bank type, the virtual blocks can be formed by virtually combined a plurality of physical blocks included in one flash memory chip and a plurality of physical blocks included in another flash memory chip. In this case, the virtual block constituted of the such the number of physical blocks that more than the number of the flash memory chips employed in the flash memory system and the number of the banks in one flash memory chip. This means that much more parallel operations can be performed so that a series of data write operations can be performed in faster.

Moreover, in the flash memory system 1 of this embodiment, although the top two virtual blocks (virtual blocks #0 and #1) are assigned as the vertical writing virtual blocks, any virtual blocks can be assigned as the vertical writing virtual blocks. For example, it is allowed that only top virtual block (virtual block #0) is assigned as the vertical writing virtual block or top four virtual blocks (virtual blocks #0 to #3) are assigned as the vertical writing virtual blocks. Further, it is preferable to provide a register for indicating the number of vertical writing virtual blocks including the top virtual block (virtual block #0). In this case, the number of vertical writing virtual blocks can be varied. As a method for setting such a register, it is preferable to use a specific external terminal of the controller 3 for setting the register and connecting the external terminal to either a power supply line or a ground line when the controller 3 is mounted. According to this method, the register can be automatically set when the controller 3 is initialized.

In the present invention, the top virtual block (virtual block #0) is not necessary to assign as the vertical writing virtual block but it can be assigned as the lateral writing virtual block.

Further, in the flash memory system 1 of this embodiment, in case of data overwriting for the lateral writing virtual block, the inter-block data transferring are performed between every pairs of physical blocks constituting the virtual block. However, in the case where the number of physical blocks to be overwritten is smaller than the number of physical blocks constituting the virtual block, it is allowed that the inter-block data transferring are performed for only physical blocks to be overwritten.

Furthermore, in the flash memory system 1 according to the above described embodiment, each physical block is composed of 32 physical pages. However, the number of physical pages composing each physical block is not limited to 32 and can be another number such as 16 or 64. The effects of the present invention is enhanced as increasing the number of physical pages composing each physical block.

Further, in the flash memory system 1 according to the above described embodiment, the address translation table 31 includes the address translating information concerning all physical blocks in which the user data are stored. However, in the present invention, the address translation table 31 is not necessary to include includes the address translating information concerning all physical blocks but it can include a part of address translating information. In this case, although a memory size required for the SRAM work area 8 can be reduced, the contents of the address translation table 31 should be updated each time when the access request for the physical block whose address translating information is not stored in the address translation table 31 is issued.

Moreover, in the flash memory system 1 according to the above described embodiment, the flash memory system 1 is embodied as a card employing the four flash memory chips 2-0 to 2-3 and the controller 3. However, the flash memory system according to the present invention is not limited to a card-shape and can be embodied in other shapes such as stick-shaped.

Further, in the flash memory system 1 according to the above described embodiment, the flash memory system 1 is embodied as a card in which the 4 flash memory chips 2-0 to 2-3 and the controller 3 being integrated. However, the present invention is not limited to the flash memory chips 2-0 to 2-3 and the controller 3 are integrated in the same package, they can be packed in individual packages. In this case, connectors must be added the package for the flash memory chips 2-0 to 23 and the package for the controller 3 to establish electrical and physical connection therebetween. Therefore, the package for the flash memory chips 2-0 to 2-3 can be removably attached to the package for the controller 3. Moreover, the invention is also not limited to the flash memory chips 2-0 to 2-3 being integrated in the same package but also encompasses the case where they are packed in individual packages.

Further, in the flash memory system 1 according to the above described embodiment, the memory capacity of each of the flash memory chips 2-0 to 2-3 is 128M bytes (1G bits). However, the memory capacity of each of the flash memory chips employed in the flash memory system according to the present invention is not limited to 128M bytes (1G bits) and can be another capacity such as 32M bytes (256M bits).

Furthermore, in the flash memory system 1 according to the above described embodiment, each physical page constituting the minimum access unit is composed of 512 bytes. However, the capacity of the physical page constituting the minimum access unit is not limited to 512 bytes but can be another capacity.

Furthermore, in the flash memory system 1 according to the above described embodiment, each flash memory cell 16 employed in the flash memory chips 2-0 to 2-3 can store 1 bit of data. However, the flash memory cells employed in the flash memory chip can be ones enabled to store 2 or more bits of data by controlling the number of electrons injected into the floating gate electrode 21.

Further, in the flash memory system 1 according to the above described embodiment, the write queue 32 is composed of 6 queue sets #0 to #5. However, the number of queue sets composing the write queue 32 is not limited to 6 and can be another number such as 1 or 8.

Furthermore, in the flash memory system 1 according to the above described embodiment, the flash memory chips 2-0 to 2-3 of NAND type are used. However, the flash memory chip which can be controlled by the method according to the present invention is not limited to the flash memory chip of NAND type and the flash memory chips of other types, AND type for example, can be controlled.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

The present invention can be embodied as a PC card conforming with the standard regulation proposed by the PCMCIA (Personal Computer Memory Card International Association). Further, the present invention can be embodied as a highly miniaturized memory card realized by the development of high-integration technologies for semiconductor devices, such as the Compact Flash™ proposed by the CFA (Compact Flash Association), the MMC™ (MultiMedia Card) proposed by the MultiMedia Card Association, the Memory Stick™ proposed by SONY corporation, the SD Memory Card™ proposed by Matsushita electric corporation, or the like.

As explained in the foregoing, the present invention provides a memory controller and a flash memory system that can perform a series of data write operations to a flash memory device fast and provides a method for perform a series of data write operations to a flash memory device fast.

The invention claimed is:

1. A memory controller for accessing a memory having a plurality of physical blocks based on a host address provided from a host computer, comprising:
    means for dividing the physical blocks into a plurality of groups;
    means for forming a plurality of virtual blocks by virtually combining a plurality of physical blocks each of which belongs to different groups, the virtual blocks can be divided into at least a first class and a second class; and
    means for assigning adjacent host addresses to different physical blocks belonging to the same virtual block of the first class and assigning adjacent host addresses to the same physical blocks belonging to the same virtual block of the second class.

2. The memory controller as claimed in claim 1, wherein one of the virtual blocks of the second class corresponds to an area including a part in which a top of the host address is assigned.

3. The memory controller as claimed in claim 1, further comprises means for determining a number of virtual blocks of the second class.

4. The memory controller as claimed in claim 1, wherein the groups are classified at least according to memory chips.

5. The memory controller as claimed in claim 1, wherein the groups are classified at least according to banks.

6. The memory controller of claim 1 wherein the means for dividing the physical blocks into a plurality of groups comprises a memory interface.

7. The memory controller of claim 1 wherein the means for assigning host addresses comprises a random access memory configured to store an address translation table.

8. The memory controller of claim 7 wherein the random access memory is further configured to store a write queue.

9. A memory controller for accessing a memory having a plurality of physical blocks, each of which is constituted of n physical pages, based on a host address provided from a host computer, comprising:
    means for forming a plurality of virtual blocks constituted of n×m virtual pages by virtually combining m physical blocks; and
    means for assigning adjacent host addresses to different physical blocks belonging to the same virtual block of the first class and assigning adjacent host addresses to the same physical blocks belonging to the same virtual block of the second class.

10. The memory controller as claimed in claim 9, wherein the adjacent virtual pages in the same virtual block belong to different physical blocks.

11. The memory controller as claimed in claim 9, wherein one of the virtual blocks of the second class corresponds to an area including a part in which a top of the host address is assigned.

12. The memory controller of claim 9 wherein the means for assigning adjacent host addresses comprises a random access memory configured to store an address translation table and a write queue.

13. A flash memory system comprising a flash memory having a plurality of physical blocks and a memory controller accessing the flash memory based on a host address provided from a host computer, the memory controller, comprising:
    means for dividing the physical blocks into a plurality of groups;
    means for forming a plurality of virtual blocks by virtually combining a plurality of physical blocks each of which belongs to different groups, the virtual blocks can be divided into at least a first class and a second class; and
    means for assigning adjacent host addresses to different physical blocks belonging to the same virtual block of the first class and assigning adjacent host addresses to the same physical blocks belonging to the same virtual block of the second class.

14. The flash memory system of claim 13, wherein the flash memory comprises a plurality of memory chips each comprising a plurality of physical blocks and the means for dividing the physical blocks into a plurality of groups comprises a memory interface configured to address the plurality of memory chips, wherein the physical blocks are divided into groups based at least in part according to a corresponding memory chip.

15. The flash memory system of claim 13 wherein the means for assigning adjacent host addresses comprises a random access memory configured to store an address translation table and a write queue.

* * * * *